US012606217B2

(12) United States Patent
Goto et al.

(10) Patent No.: US 12,606,217 B2
(45) Date of Patent: Apr. 21, 2026

(54) DRIVER ASSISTANCE APPARATUS, DRIVER ASSISTANCE PROCESSING METHOD, AND RECORDING MEDIUM

(71) Applicant: SUBARU CORPORATION, Tokyo (JP)

(72) Inventors: Ikuo Goto, Tokyo (JP); Shunsuke Tezuka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 5 days.

(21) Appl. No.: 18/881,796

(22) PCT Filed: May 23, 2023

(86) PCT No.: PCT/JP2023/019063
§ 371 (c)(1),
(2) Date: Jan. 7, 2025

(87) PCT Pub. No.: WO2024/241465
PCT Pub. Date: Nov. 28, 2024

(65) Prior Publication Data
US 2026/0008482 A1      Jan. 8, 2026

(51) Int. Cl.
*B60W 60/00* (2020.01)
*B60W 30/095* (2012.01)
*G08G 1/16* (2006.01)

(52) U.S. Cl.
CPC .... *B60W 60/0059* (2020.02); *B60W 30/0953* (2013.01); *B60W 60/001* (2020.02);
(Continued)

(58) Field of Classification Search
CPC ........... B60W 60/0059; B60W 60/001; B60W 30/0953; B60W 2554/4029;
(Continued)

(56) References Cited

U.S. PATENT DOCUMENTS

2022/0161787 A1      5/2022 Kinoshita
2025/0256718 A1*      8/2025 Matsunaga ..... B60W 30/18154

FOREIGN PATENT DOCUMENTS

JP      2022-083196 A      6/2022

OTHER PUBLICATIONS

Matsushita, K. et al. "Application of Driver Model Based on Feeling of Risk in Forward View to Automated Driving Control", Transactions of the Society of Automotive Engineers of Japan, vol. 48, No. 3, pp. 763-769 (English abstract).
(Continued)

*Primary Examiner* — Navid Z. Mehdizadeh
*Assistant Examiner* — Oliver Tan
(74) *Attorney, Agent, or Firm* — Rimon P.C.

(57) ABSTRACT

A driver assistance apparatus sets a rule deviation risk indicating a risk of deviation of a vehicle from a traffic rule related to travel of the vehicle for an object of the traffic rule, in accordance with one or both of an intensity of the traffic rule and an application time zone of the traffic rule, and sets a rule deviation allowable risk indicating a travel allowable area of the vehicle against the rule deviation risk. The rule deviation allowable risk is set higher in proportion to a magnitude of a vehicle speed of the vehicle. The driver assistance apparatus sets a target track and a target speed for automated driving of the vehicle, based on the rule deviation risk and the rule deviation allowable risk, to cause the vehicle to travel in a location where the rule deviation allowable risk is higher than the rule deviation risk.

12 Claims, 20 Drawing Sheets

(52) U.S. Cl.
CPC ........... *G08G 1/16* (2013.01); *B60W 2520/10*
(2013.01); *B60W 2552/53* (2020.02); *B60W*
*2554/4029* (2020.02); *B60W 2555/60*
(2020.02); *B60W 2720/10* (2013.01)

(58) Field of Classification Search
CPC ......... B60W 2552/53; B60W 2555/60; B60W
2520/10; B60W 2720/10; G08G 1/16
See application file for complete search history.

(56) References Cited

OTHER PUBLICATIONS

International Search Report (with English translation) and Written
Opinion dated Aug. 8, 2023, from International Application No.
PCT/JP2023/019063, 8 pages.

* cited by examiner

[ FIG. 1 ]
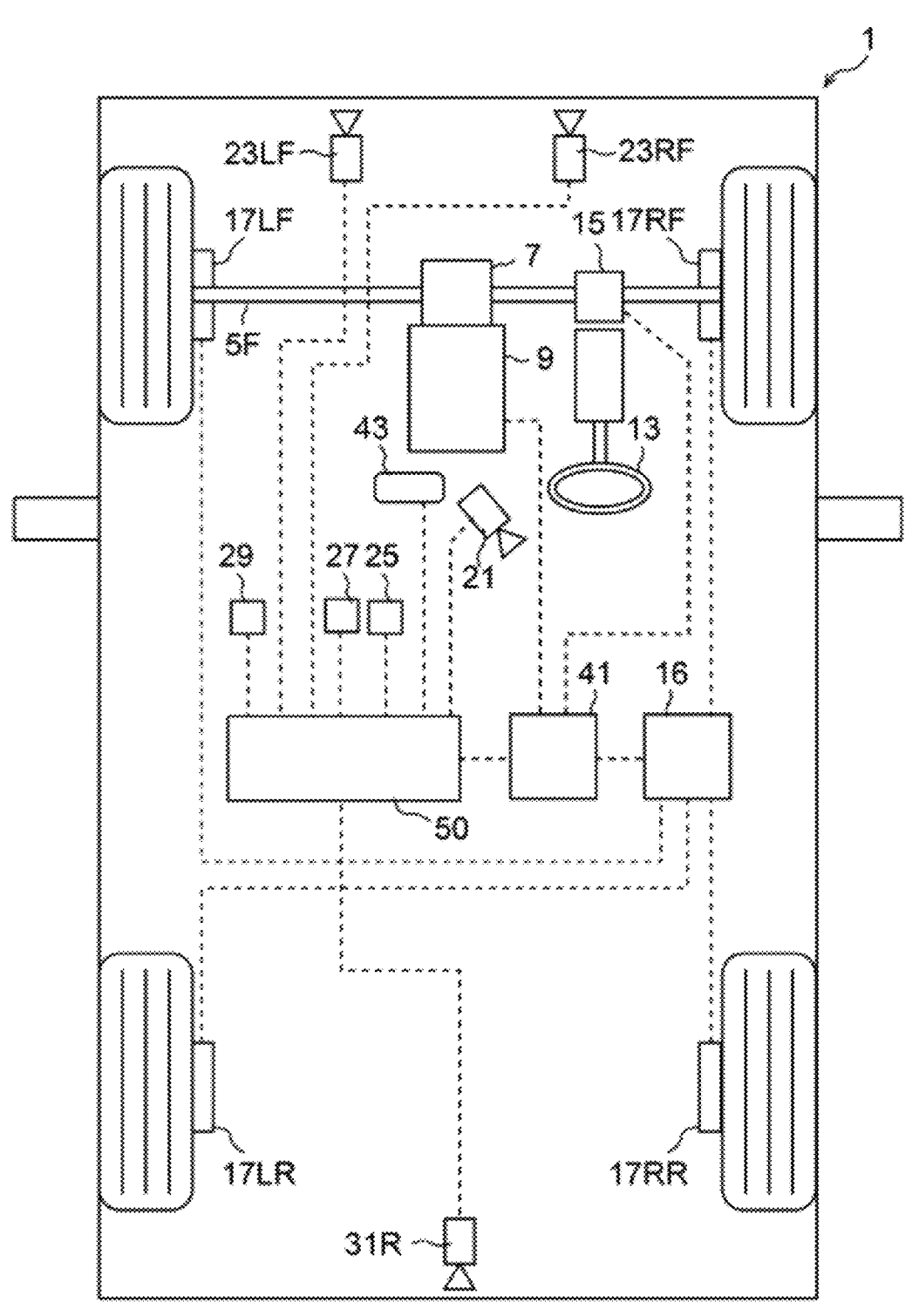

[ FIG. 2 ]

```
                                              ┌────── 50
  ┌─── 21                          ┌──────────────────────────────┐
  ┌──────────────────┐            │                     ┌──── 51  │
  │   IN-VEHICLE     │──────▶     │  ┌────────────────────────────┐│
  │ IMAGING CAMERA   │            │  │  PROCESSING UNIT   ┌── 61  ││
  └──────────────────┘            │  │  ┌──────────────────────┐  ││
  ┌─── 23                          │  │  │      OBTAINER        │  ││
  ┌──────────────────┐            │  │  └──────────────────────┘  ││
  │   SURROUNDING    │            │  │                    ┌── 63  ││
  │  ENVIRONMENT     │──────▶     │  │  ┌──────────────────────┐  ││
  │     SENSOR       │            │  │  │    SURROUNDING       │  ││
  └──────────────────┘            │  │  │ ENVIRONMENT DETECTOR │  ││
  ┌─── 25                          │  │  └──────────────────────┘  ││
  ┌──────────────────┐            │  │                    ┌── 65  ││
  │  VEHICLE-STATE   │──────▶     │  │  ┌──────────────────────┐  ││
  │     SENSOR       │            │  │  │ LEARNING PROCESSOR   │  ││
  └──────────────────┘            │  │  └──────────────────────┘  ││
  ┌─── 27                          │  │                    ┌── 67  ││
  ┌──────────────────┐            │  │  ┌──────────────────────┐  ││
  │   GNSS SENSOR    │──────▶     │  │  │     RISK SETTER      │  ││
  └──────────────────┘            │  │  └──────────────────────┘  ││
  ┌─── 29                          │  │                    ┌── 69  ││
  ┌──────────────────┐            │  │  ┌──────────────────────┐  ││
  │ MAP-DATA STORAGE │◀─────▶     │  │  │     ALLOWABLE        │  ││
  └──────────────────┘            │  │  │    RISK SETTER       │  ││
  ┌─── 41                          │  │  └──────────────────────┘  ││
  ┌──────────────────┐            │  │                    ┌── 71  ││
  │    VEHICLE       │◀─────      │  │  ┌──────────────────────┐  ││
  │  CONTROLLER      │            │  │  │ DRIVING CONDITION    │  ││
  └──────────────────┘            │  │  │     SETTER           │  ││
  ┌─── 43                          │  │  └──────────────────────┘  ││
  ┌──────────────────┐            │  │                    ┌── 73  ││
  │    NOTIFIER      │◀─────      │  │  ┌──────────────────────┐  ││
  └──────────────────┘            │  │  │   NOTIFICATION       │  ││
           1                      │  │  │    PROCESSOR         │  ││
                                  │  │  └──────────────────────┘  ││
                                  │  └────────────────────────────┘│
                                  │       ▲              ▲         │
                                  │    ┌── 53         ┌── 55       │
                                  │  ┌────────┐   ┌──────────┐    │
                                  │  │STORAGE │   │ LEARNED  │    │
                                  │  └────────┘   │  DATA    │    │
                                  │               │ STORAGE  │    │
                                  │               └──────────┘    │
                                  └──────────────────────────────┘
```

[ FIG. 3 ]

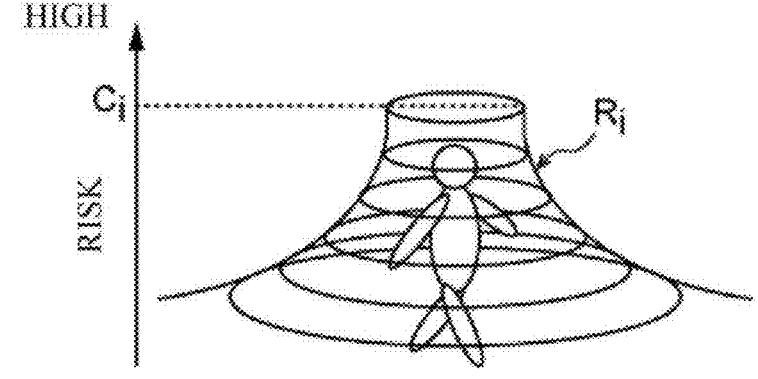

[ FIG. 4 ]
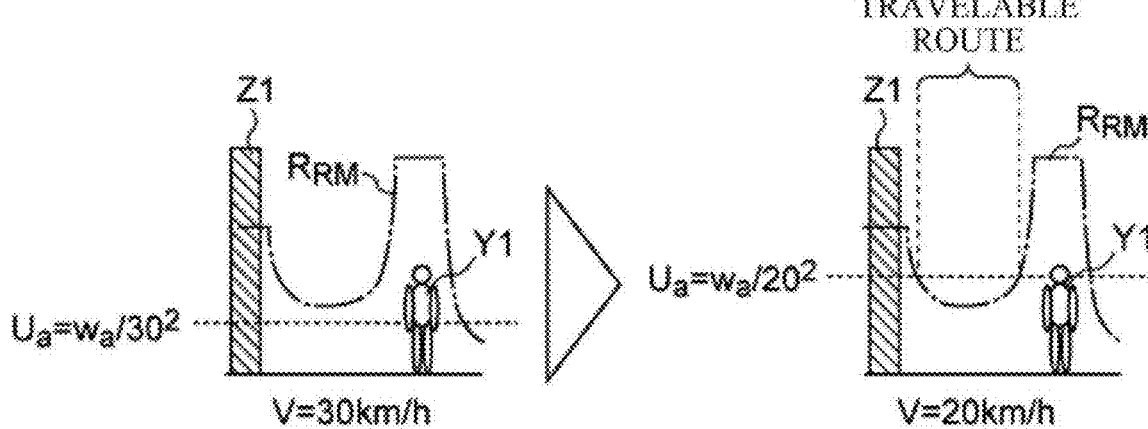
[ FIG. 5 ]
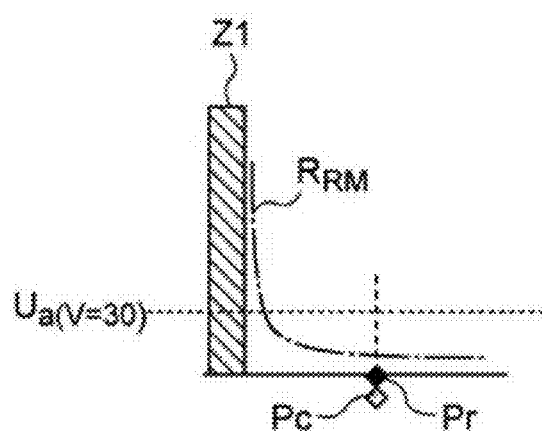
[ FIG. 6 ]
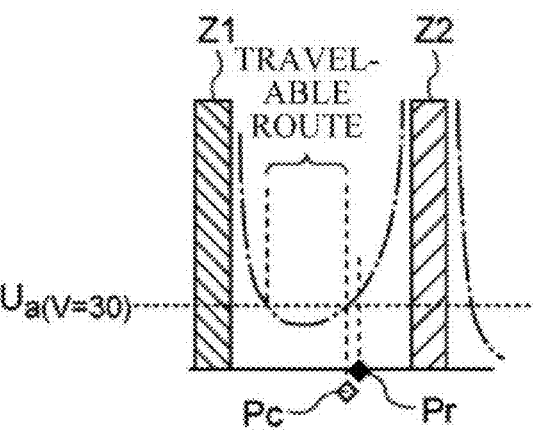

[ FIG. 7 ]
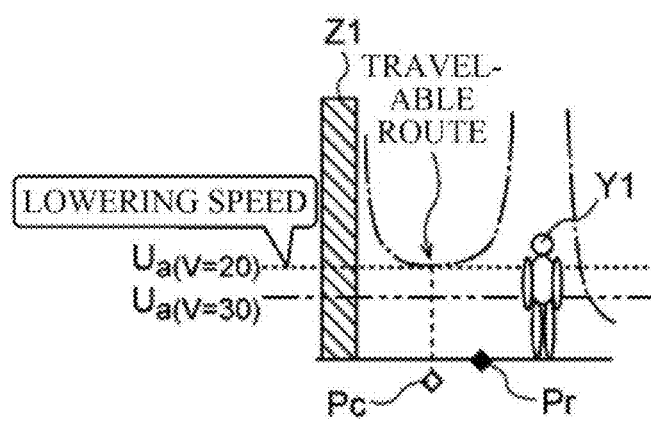
[ FIG. 8 ]
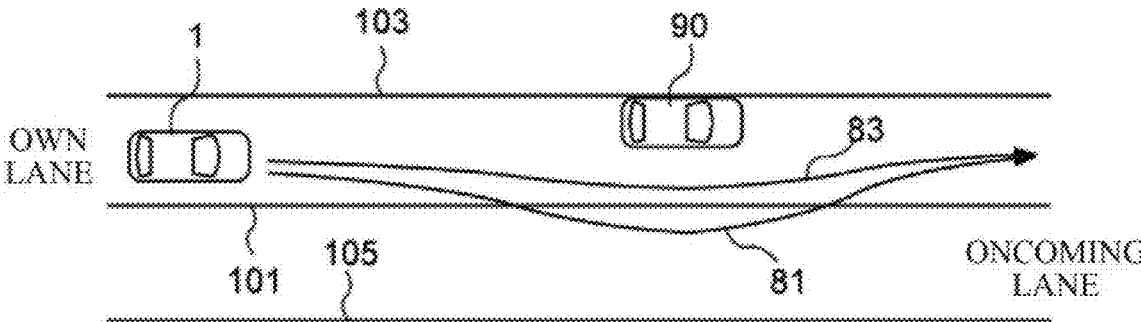
[ FIG. 9 ]
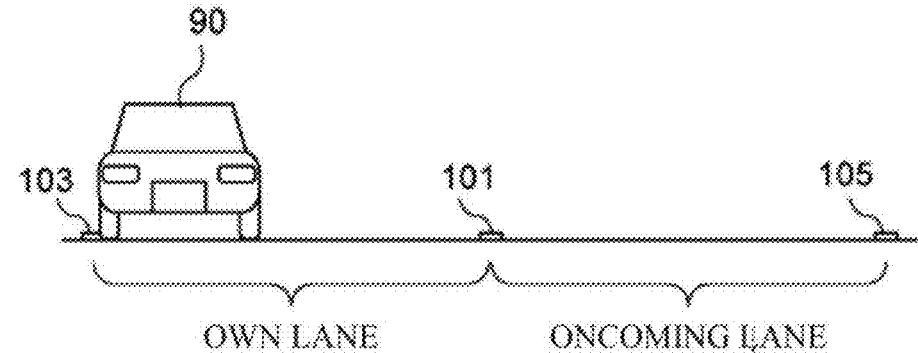
[ FIG. 10 ]
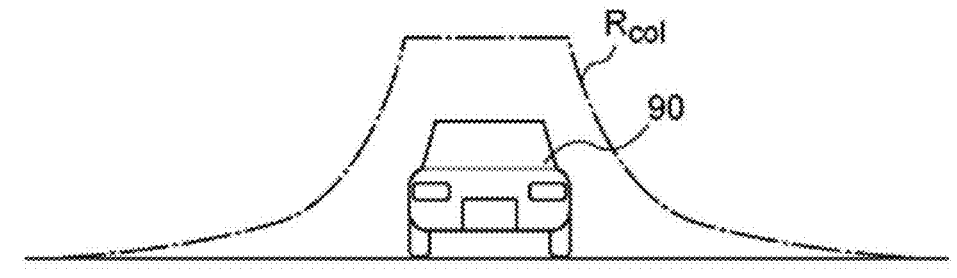

[ FIG. 11 ]
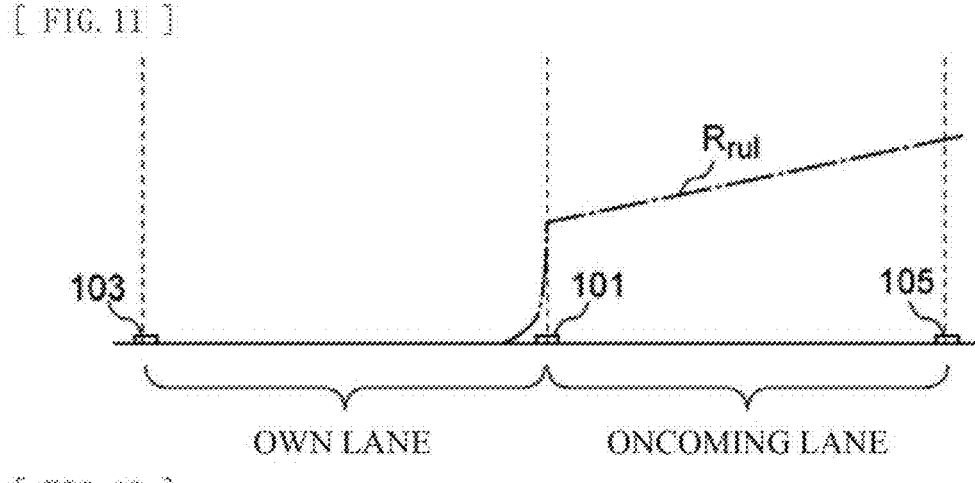
OWN LANE                ONCOMING LANE
[ FIG. 12 ]
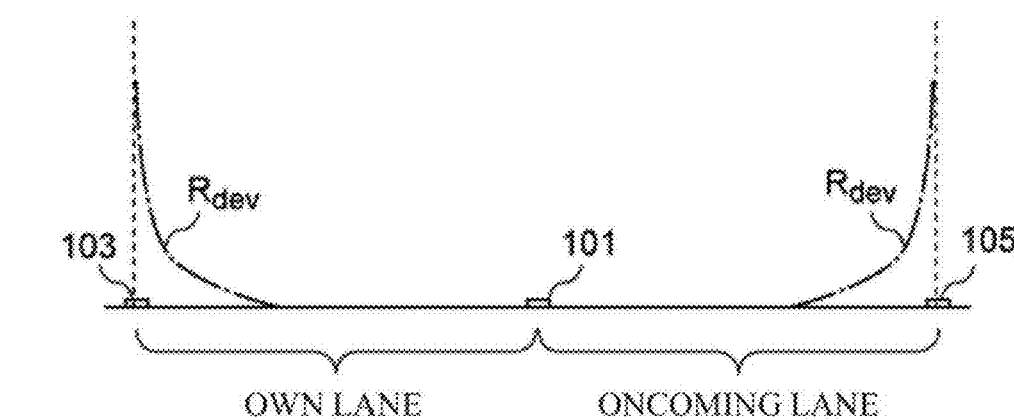
OWN LANE                ONCOMING LANE
[ FIG. 13 ]
| KIND OF BOUNDARY LINE/TRAFFIC RESTRICTION ZONE | INTENSITY OF TRAFFIC RULE |
|---|---|
| BROKEN LINE | LOW |
| WHITE LINE | MEDIUM |
| ORANGE LINE | HIGH |
| ZEBRA ZONE | MEDIUM |
| NO-ENTRY ZONE | HIGH |

[ FIG. 14 ]
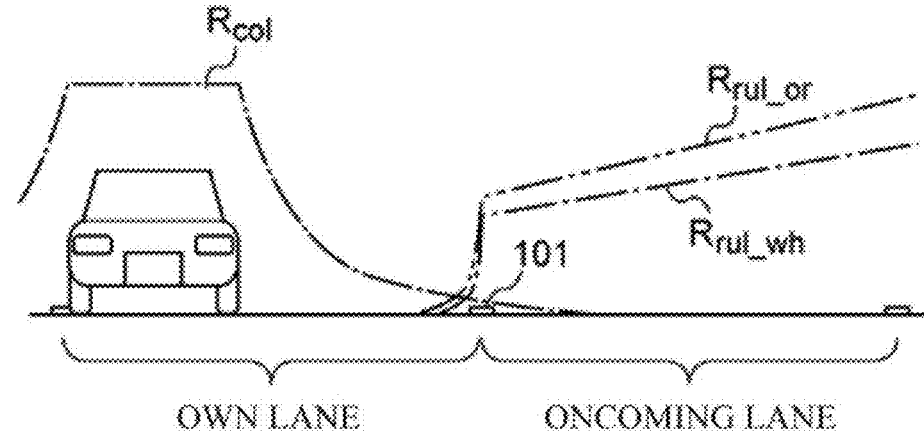
OWN LANE        ONCOMING LANE
[ FIG. 15 ]
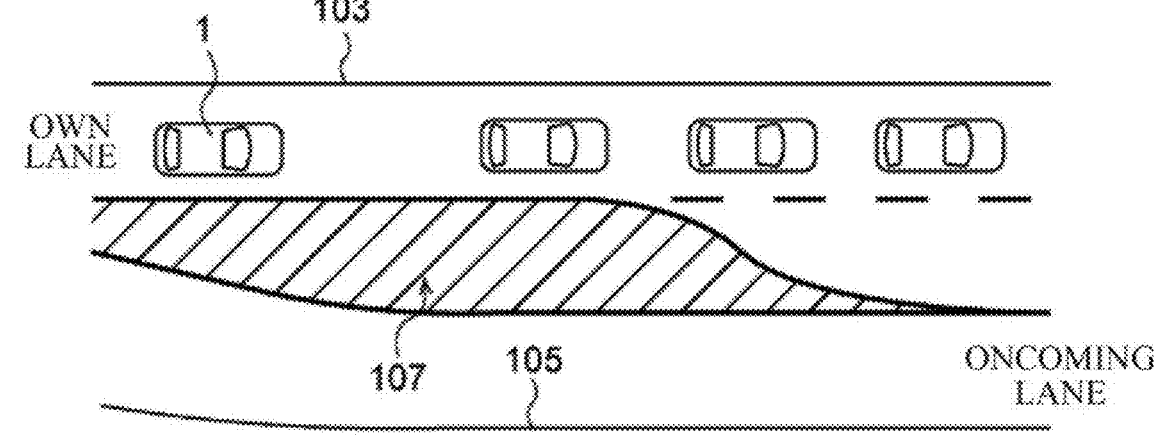
[ FIG. 16 ]
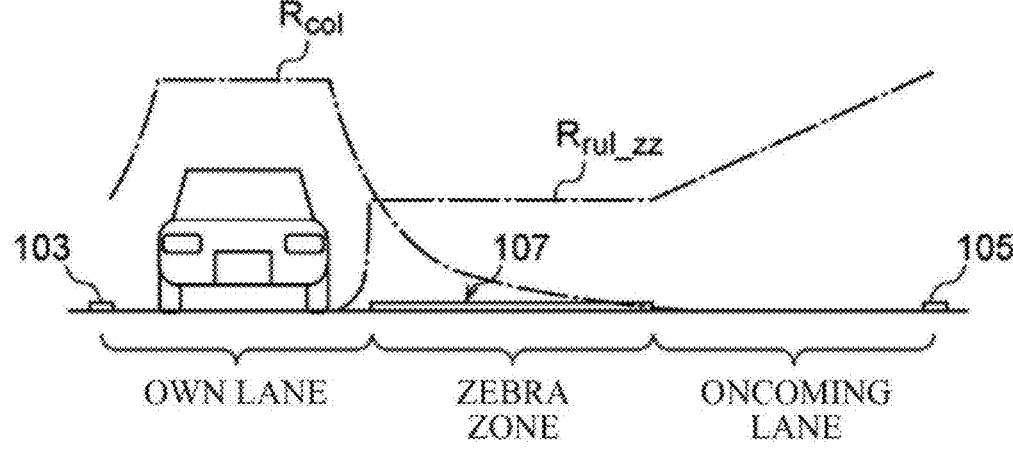
OWN LANE        ZEBRA ZONE        ONCOMING LANE

[ FIG. 17 ]
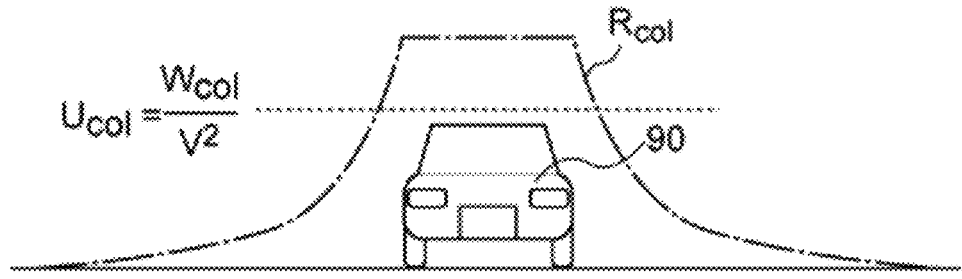
$$U_{col} = \frac{W_{col}}{V^2}$$
[ FIG. 18 ]
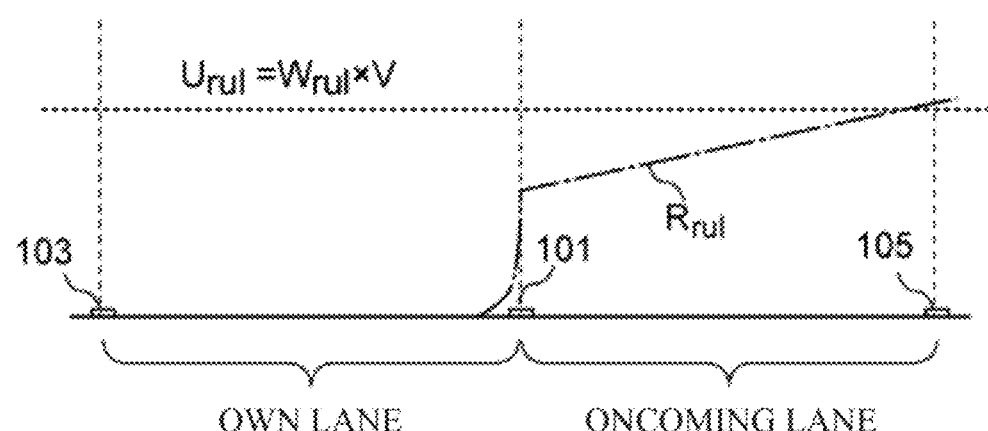
$$U_{rul} = W_{rul} \times V$$
OWN LANE     ONCOMING LANE
[ FIG. 19 ]
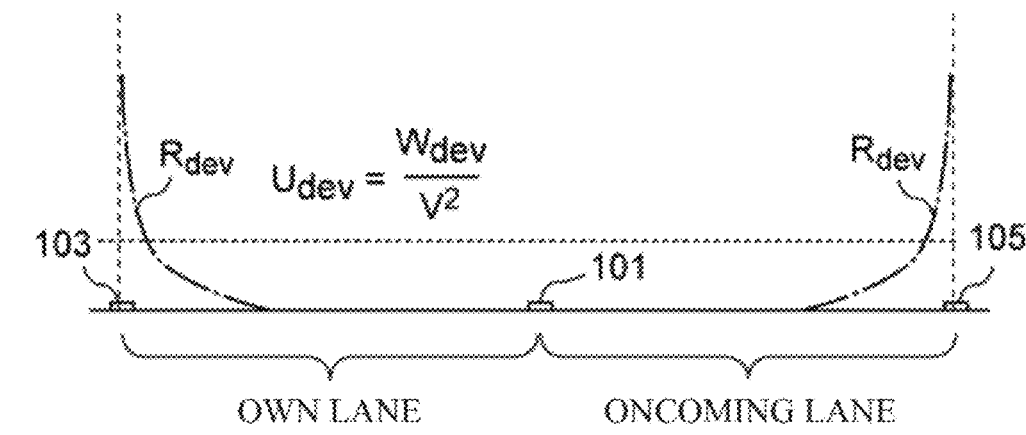
$$U_{dev} = \frac{W_{dev}}{V^2}$$
OWN LANE     ONCOMING LANE

[ FIG. 20 ]
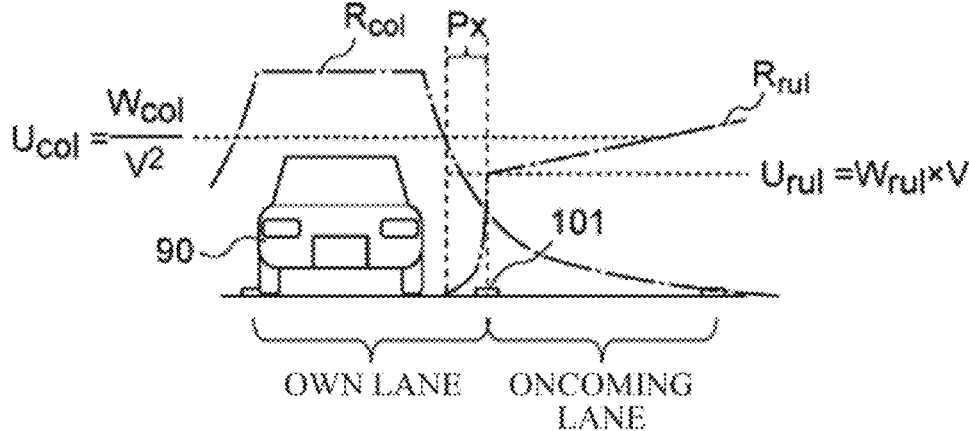
[ FIG. 21 ]
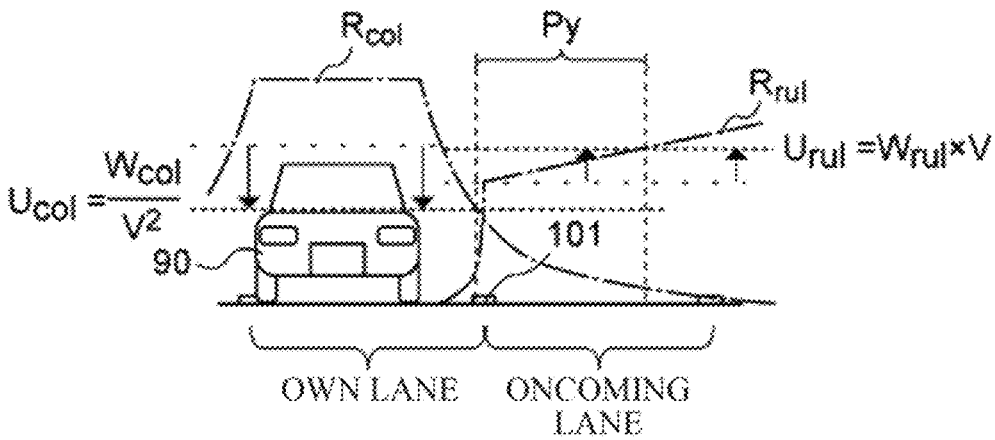
[ FIG. 22 ]
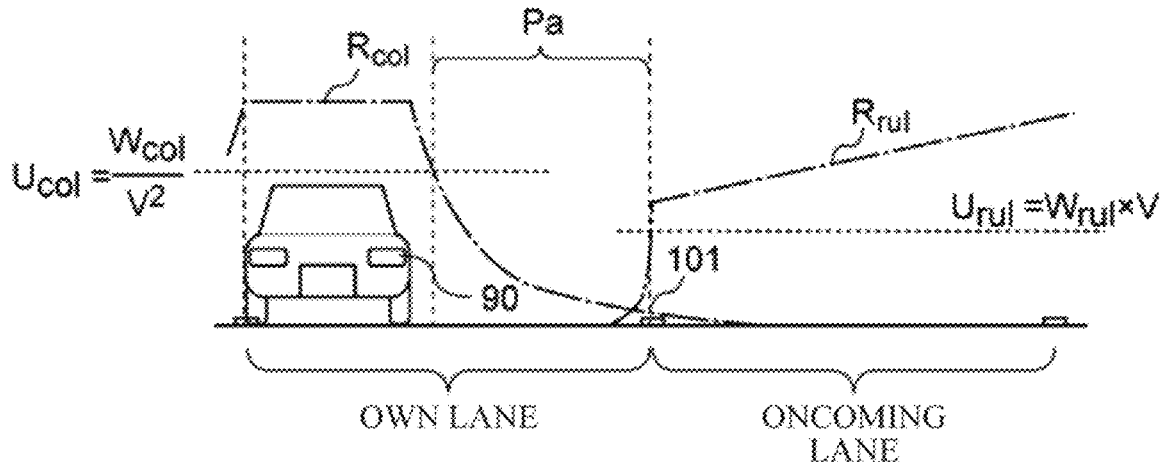

[ FIG. 23 ]
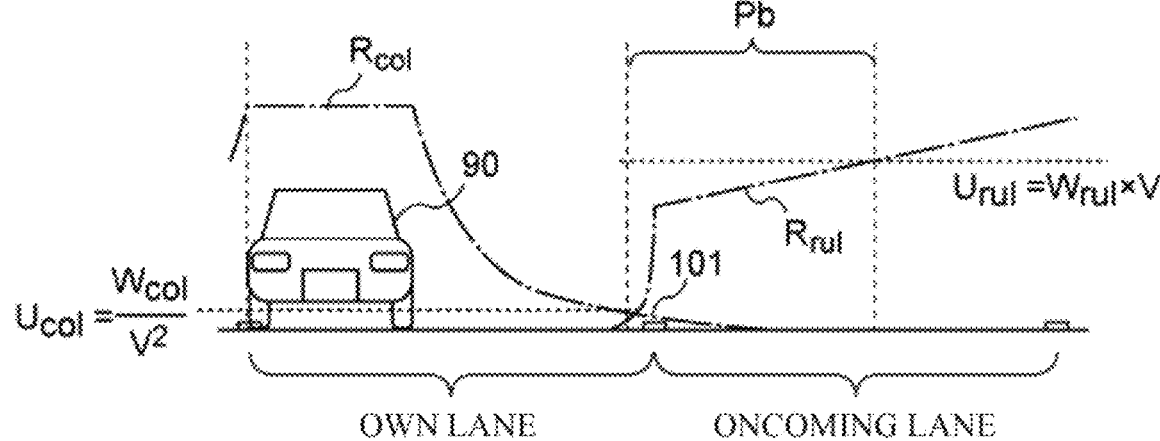
[ FIG. 24 ]
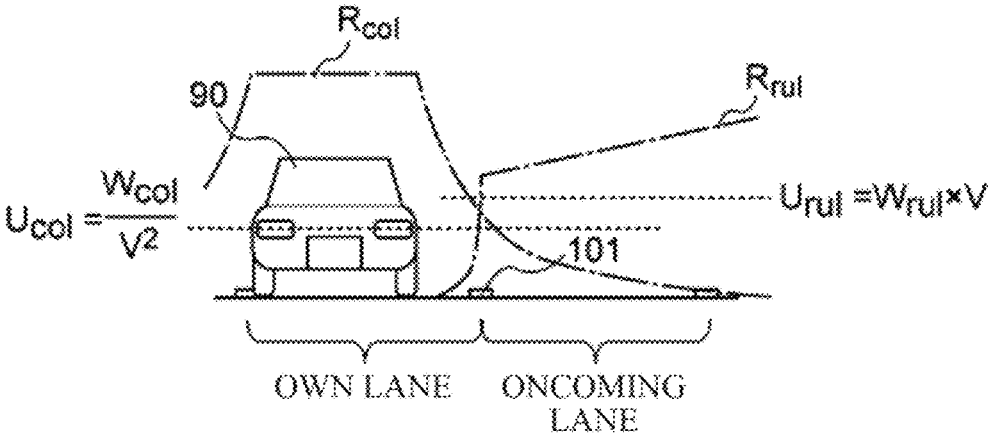
[ FIG. 25 ]
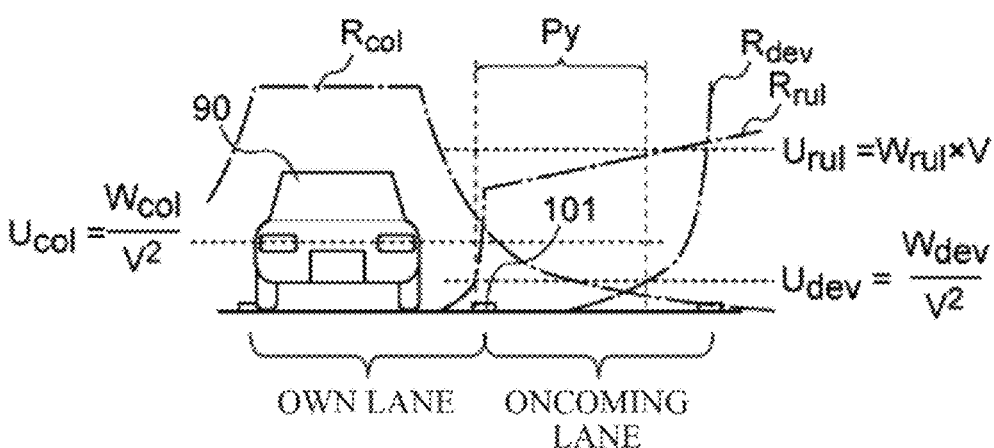

[ FIG. 26 ]
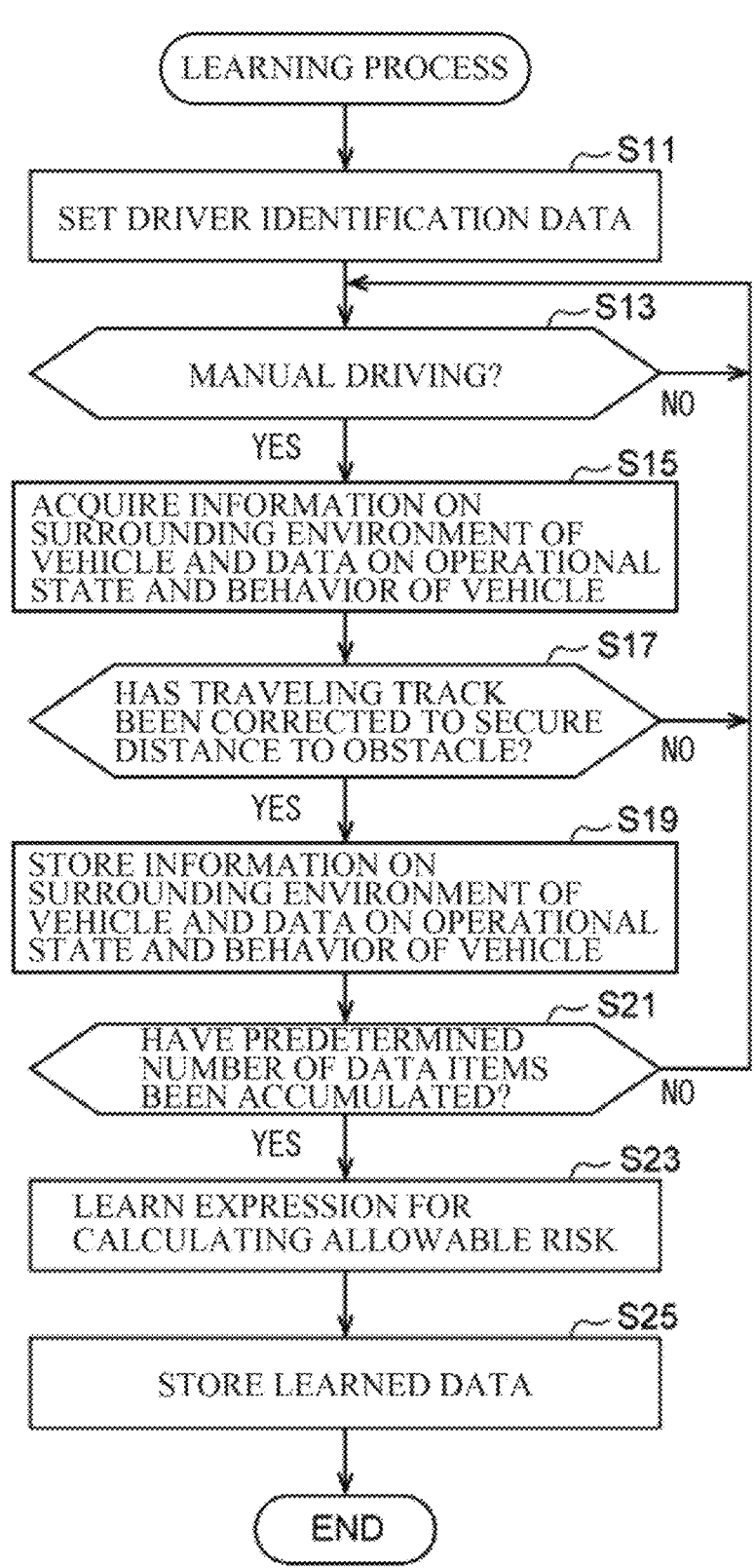

[ FIG. 27 ]
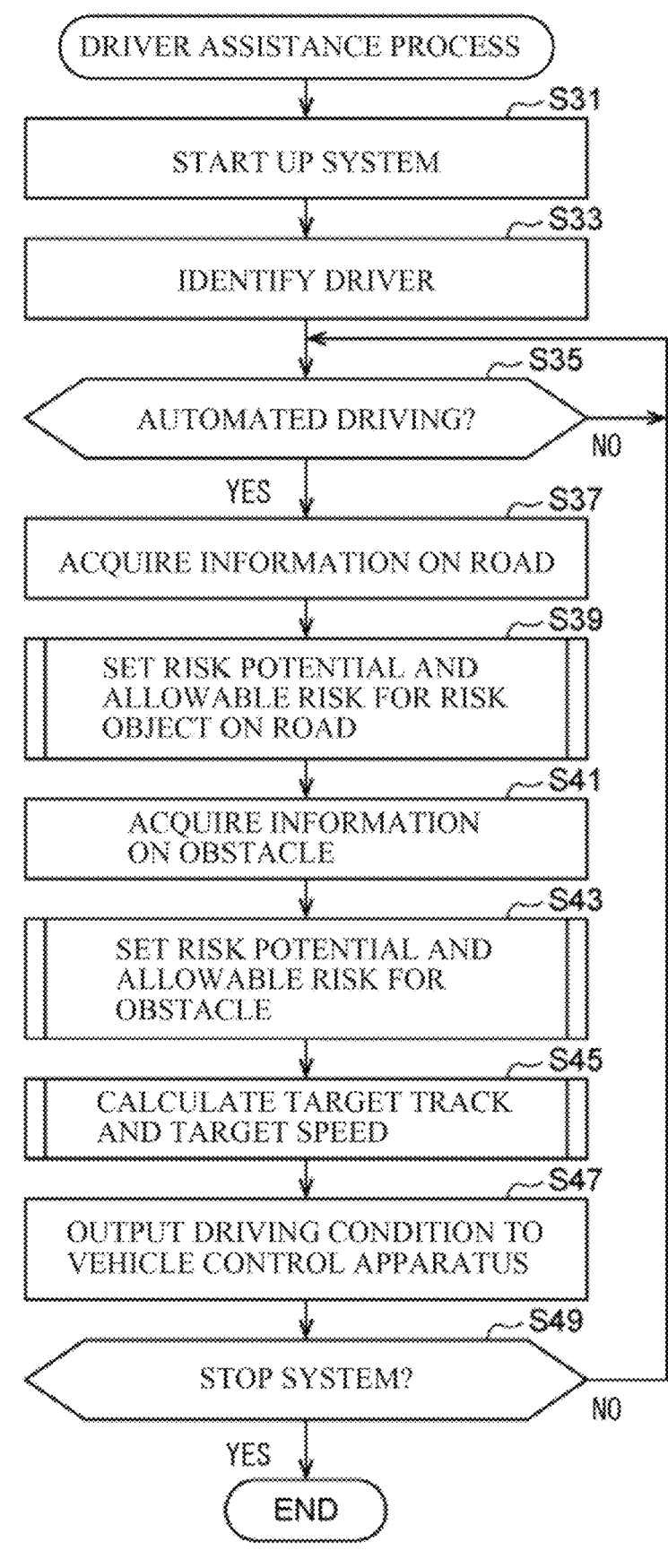

[ FIG. 28 ]

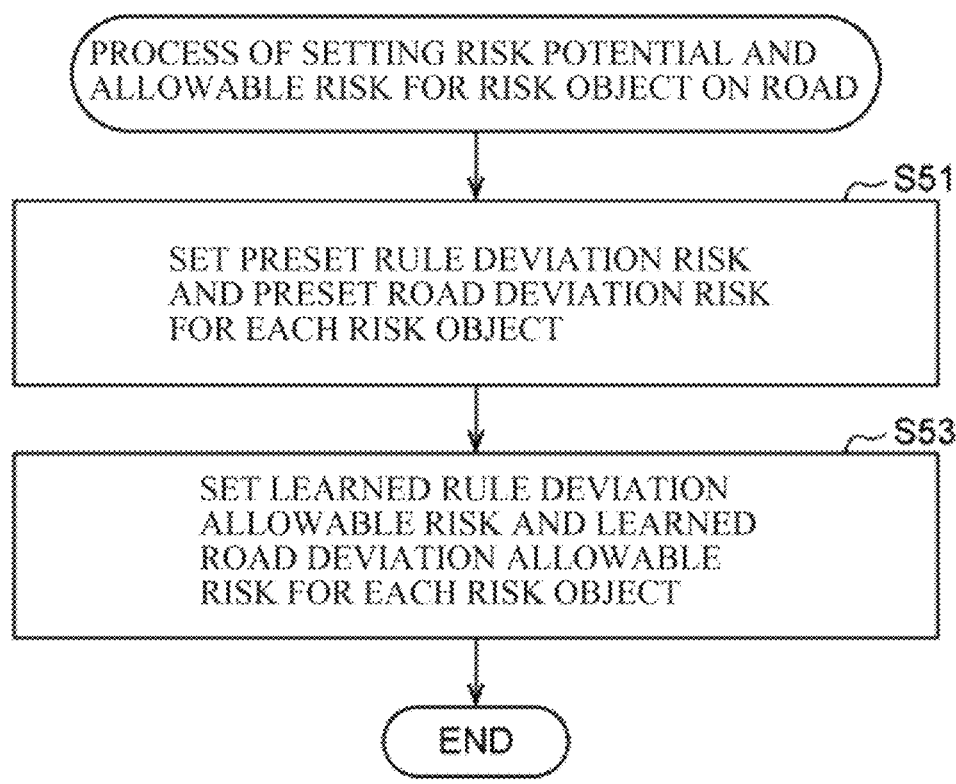

PROCESS OF SETTING RISK POTENTIAL AND
ALLOWABLE RISK FOR RISK OBJECT ON ROAD

S51

SET PRESET RULE DEVIATION RISK
AND PRESET ROAD DEVIATION RISK
FOR EACH RISK OBJECT

S53

SET LEARNED RULE DEVIATION
ALLOWABLE RISK AND LEARNED
ROAD DEVIATION ALLOWABLE
RISK FOR EACH RISK OBJECT

END

[ FIG. 29 ]

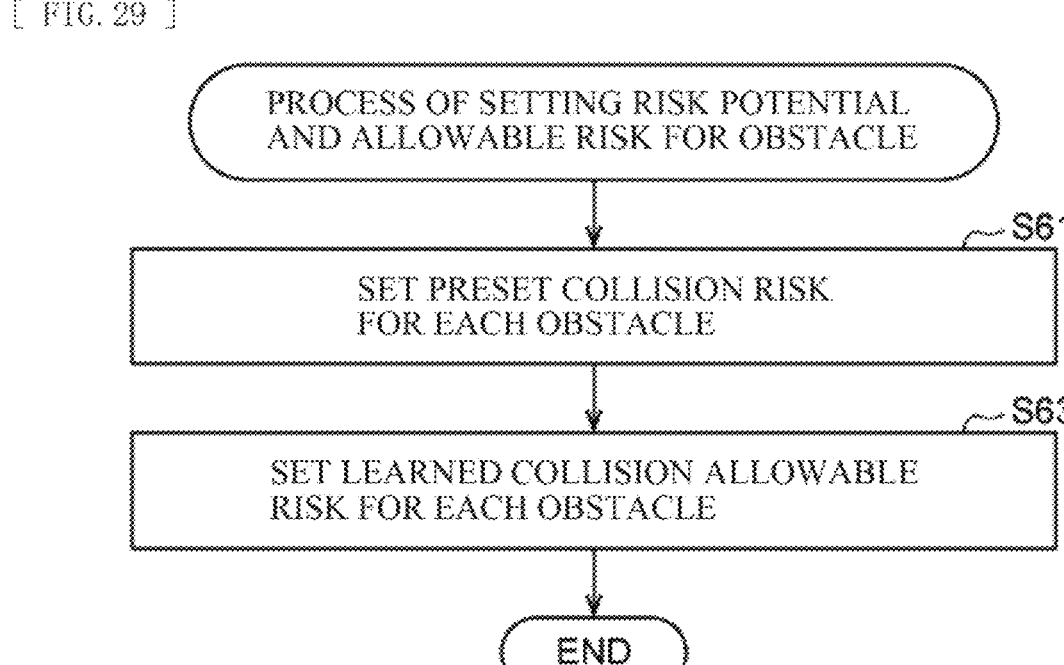

PROCESS OF SETTING RISK POTENTIAL
AND ALLOWABLE RISK FOR OBSTACLE

S61

SET PRESET COLLISION RISK
FOR EACH OBSTACLE

S63

SET LEARNED COLLISION ALLOWABLE
RISK FOR EACH OBSTACLE

END

[ FIG. 30 ]
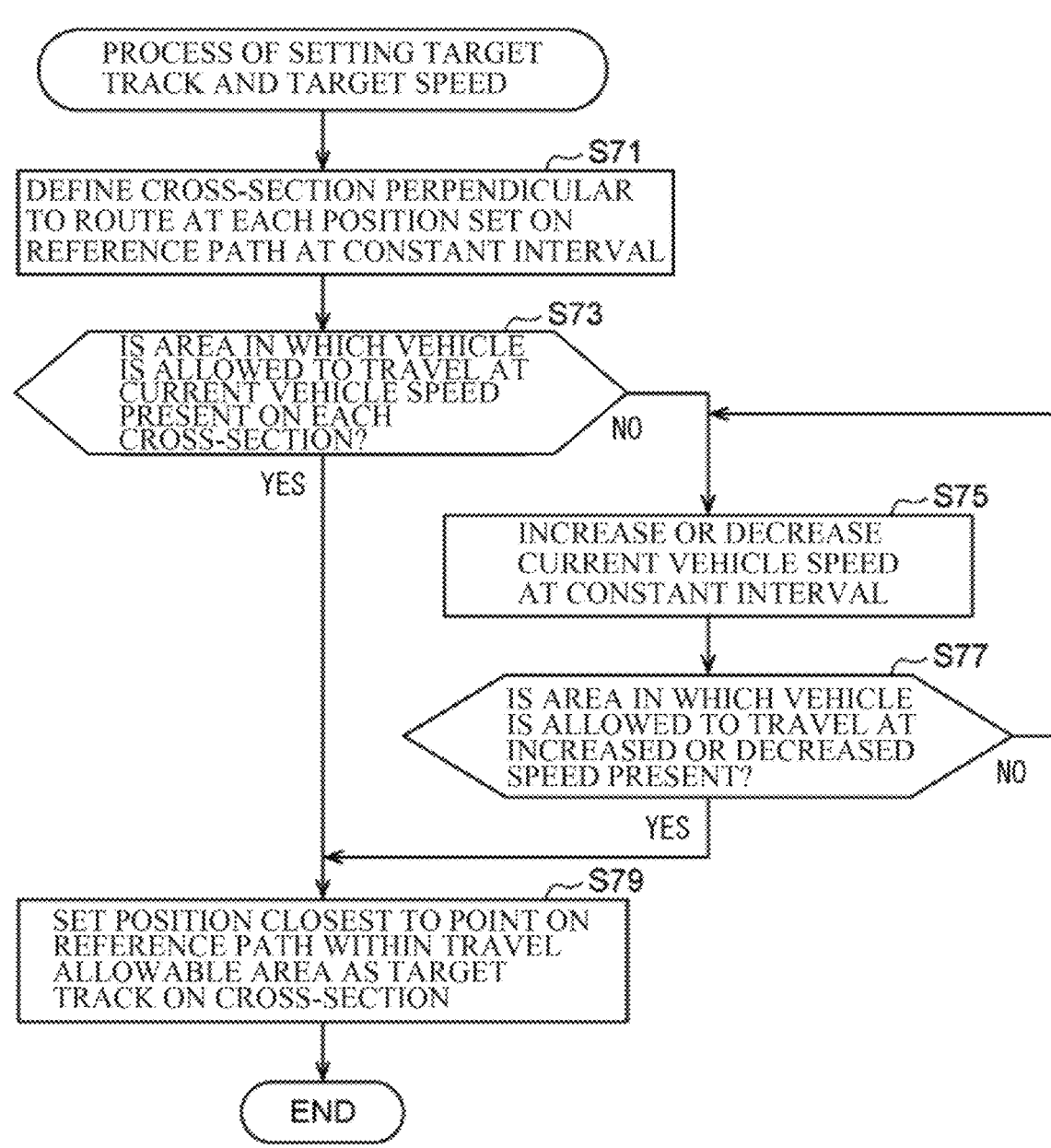

[ FIG. 31 ]
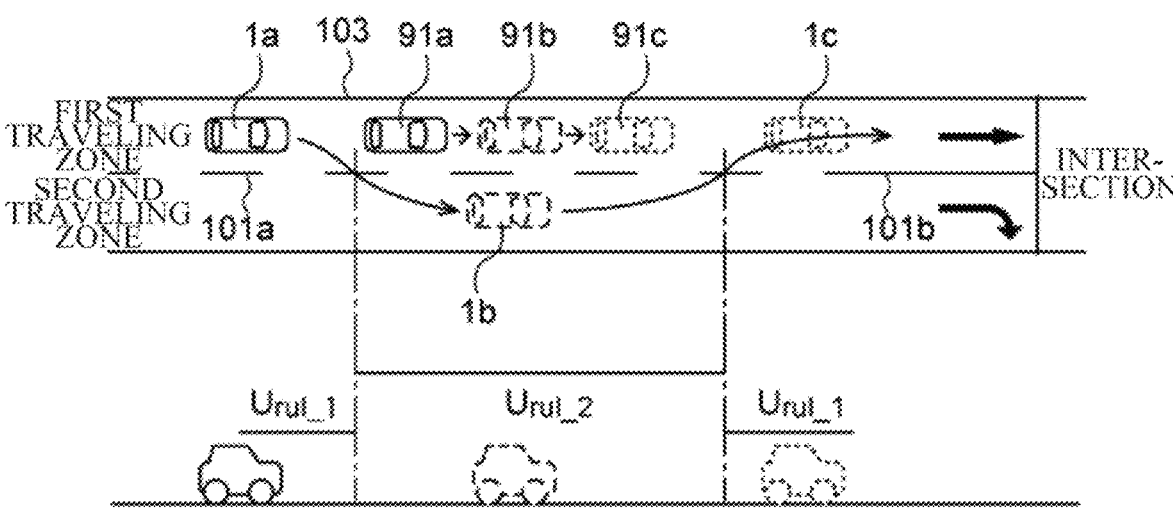

[ FIG. 32 ]
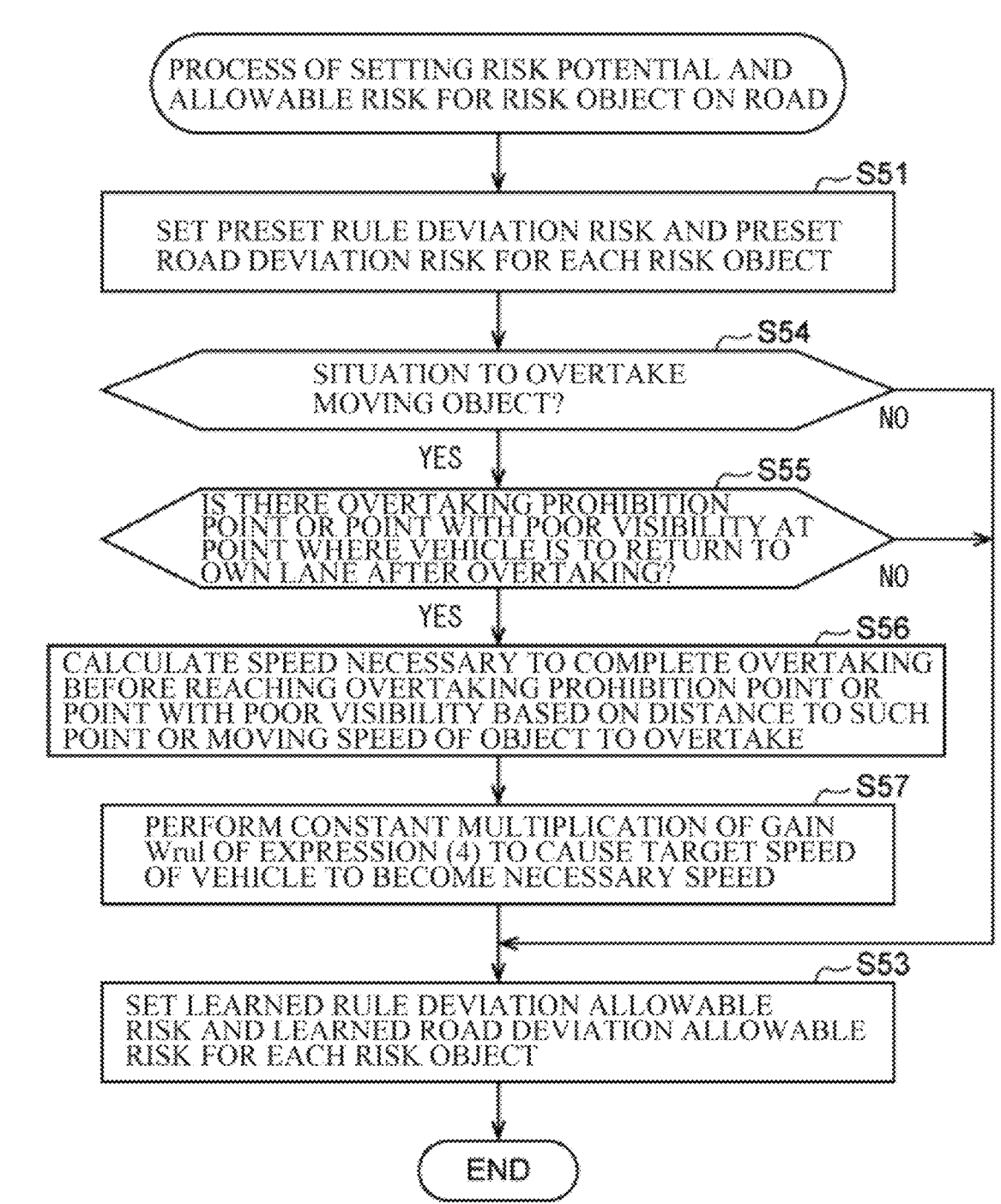

[ FIG. 33 ]
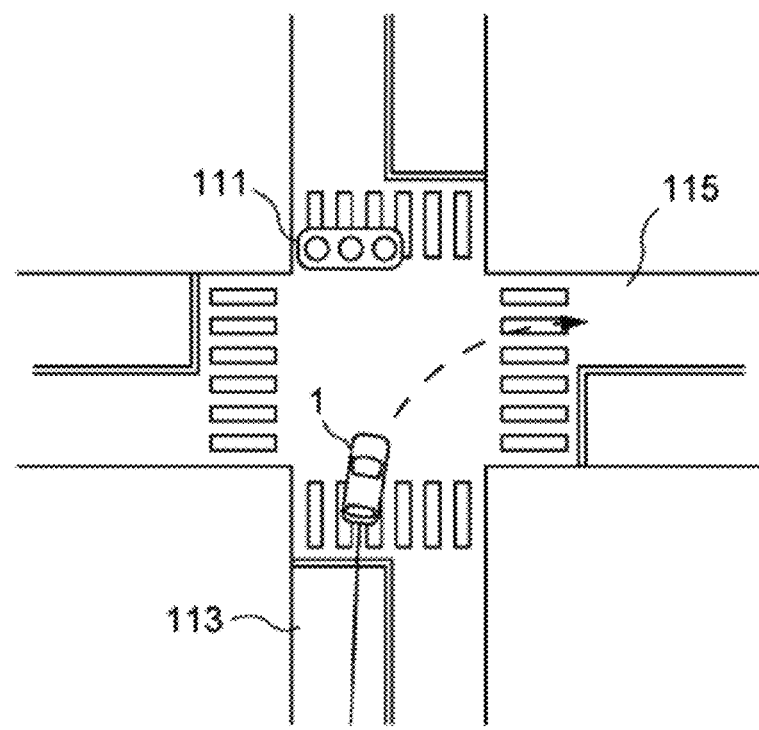
[ FIG. 34 ]
| LIGHTING COLOR OF TRAFFIC LIGHT | INTENSITY OF TRAFFIC RULE |
|---|---|
| GREEN | LOW |
| YELLOW | MEDIUM |
| RED | HIGH |

[ FIG. 35 ]
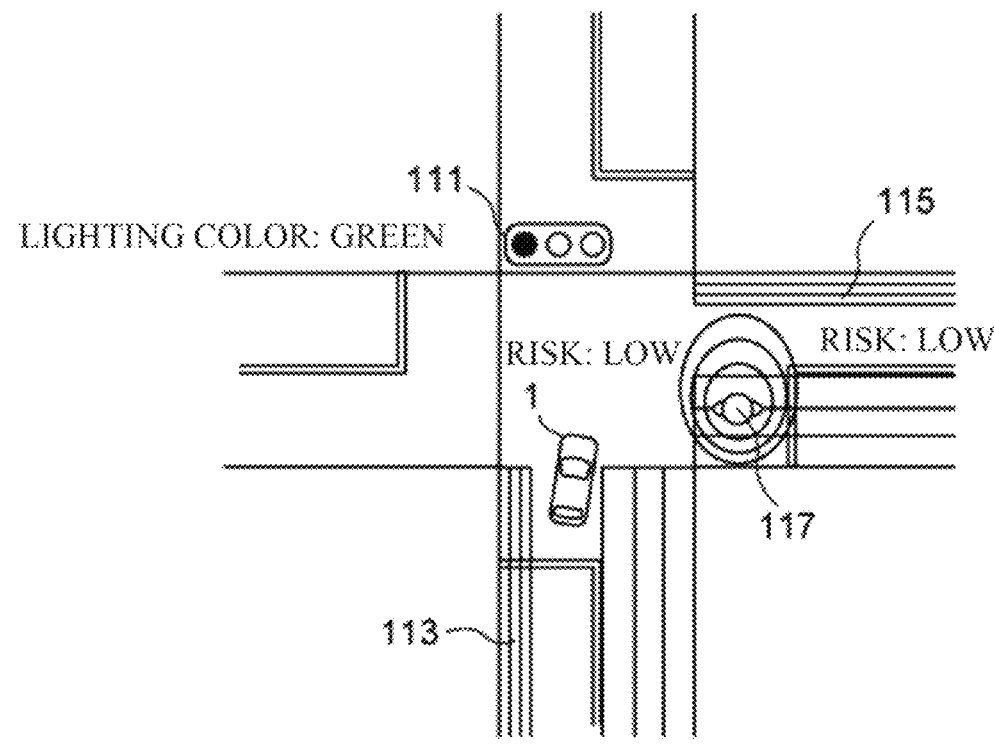
[ FIG. 36 ]
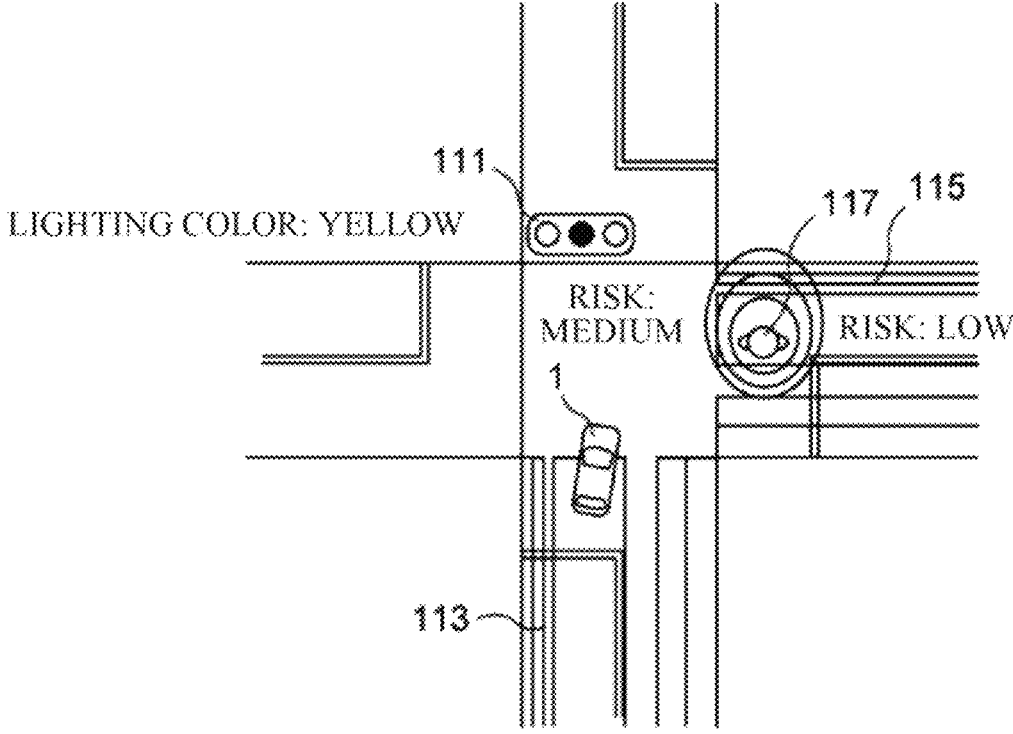

[ FIG. 37 ]
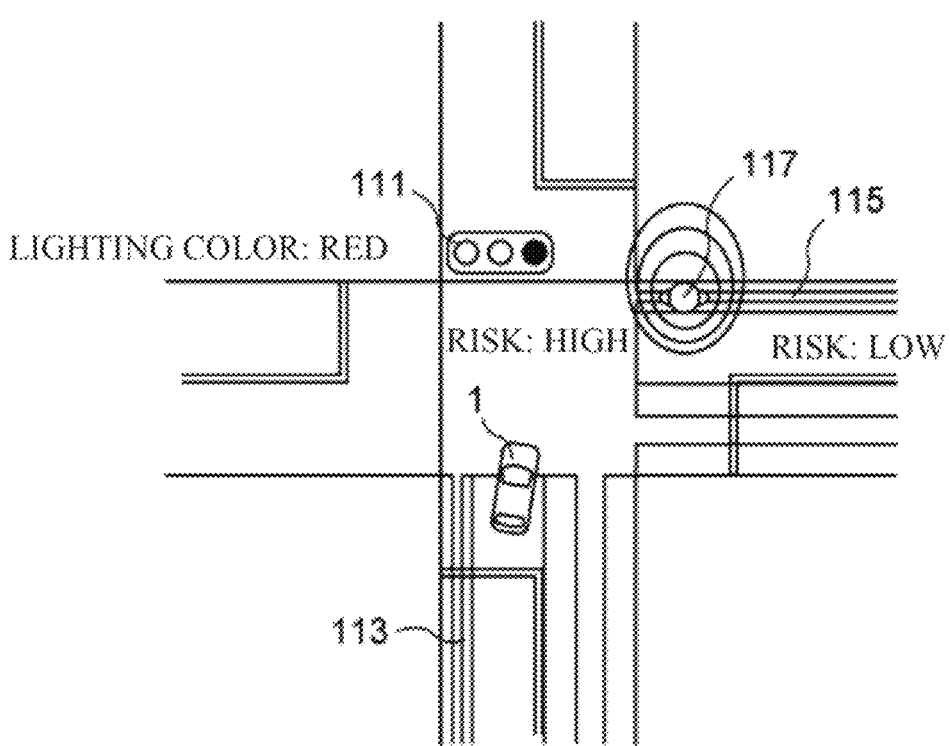

[ FIG. 38 ]
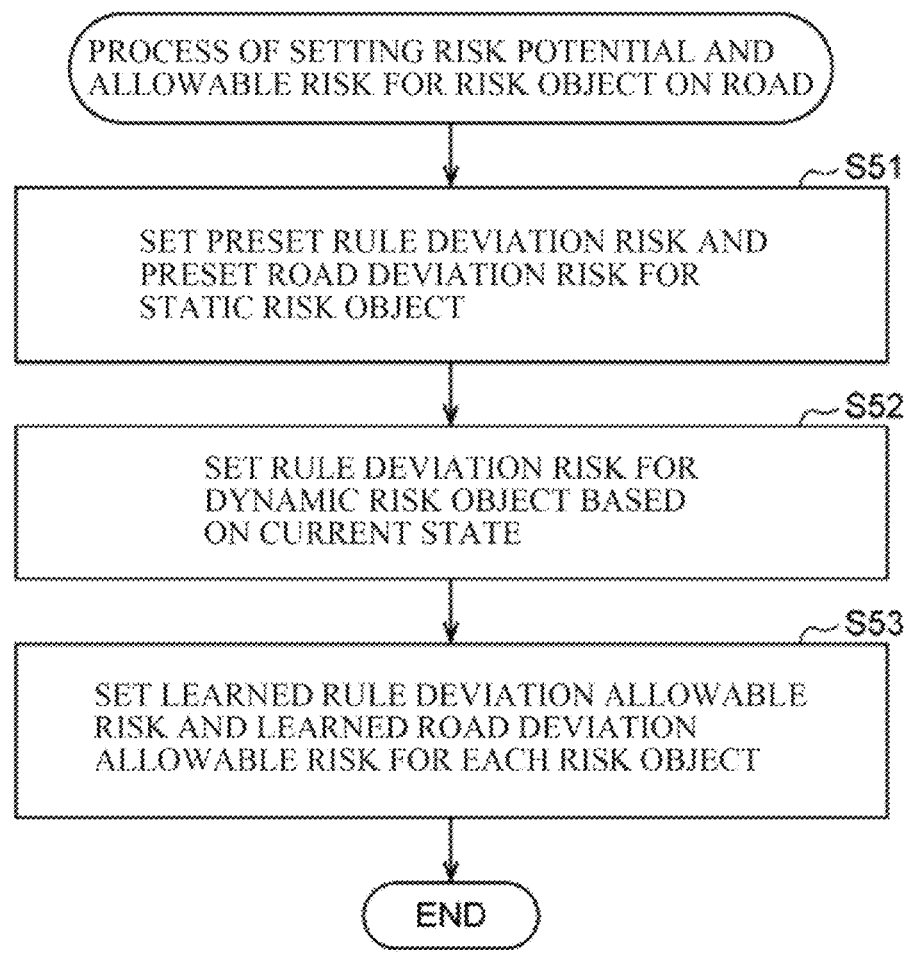
PROCESS OF SETTING RISK POTENTIAL AND
ALLOWABLE RISK FOR RISK OBJECT ON ROAD
~S51
SET PRESET RULE DEVIATION RISK AND
PRESET ROAD DEVIATION RISK FOR
STATIC RISK OBJECT
~S52
SET RULE DEVIATION RISK FOR
DYNAMIC RISK OBJECT BASED
ON CURRENT STATE
~S53
SET LEARNED RULE DEVIATION ALLOWABLE
RISK AND LEARNED ROAD DEVIATION
ALLOWABLE RISK FOR EACH RISK OBJECT
END
[ FIG. 39 ]
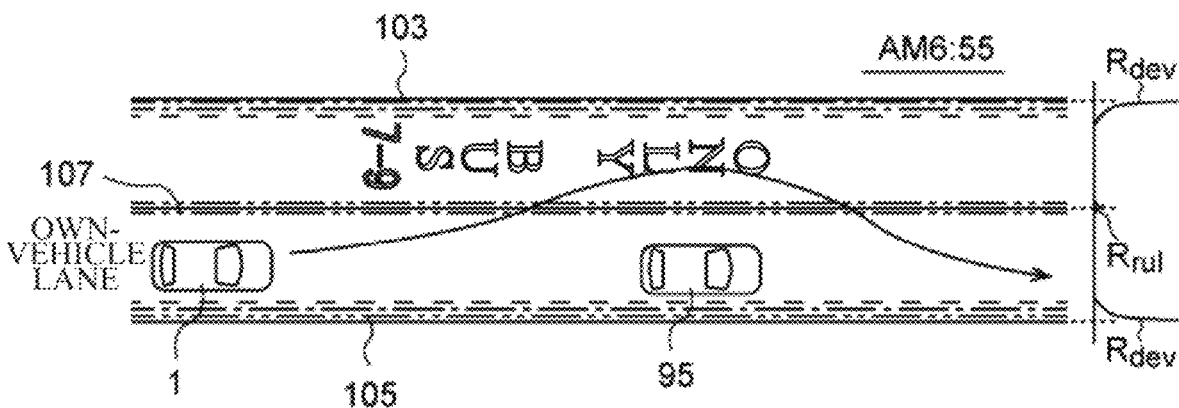

[ FIG. 40 ]
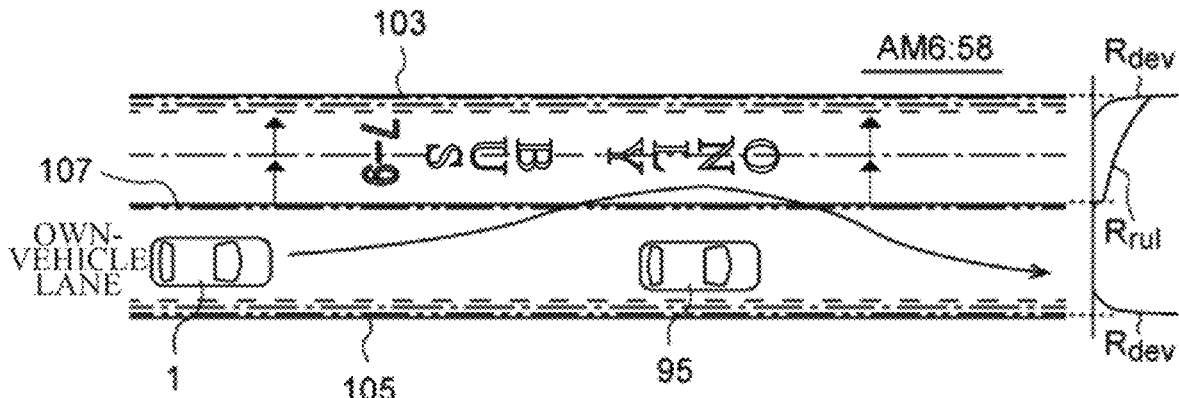
[ FIG. 41 ]
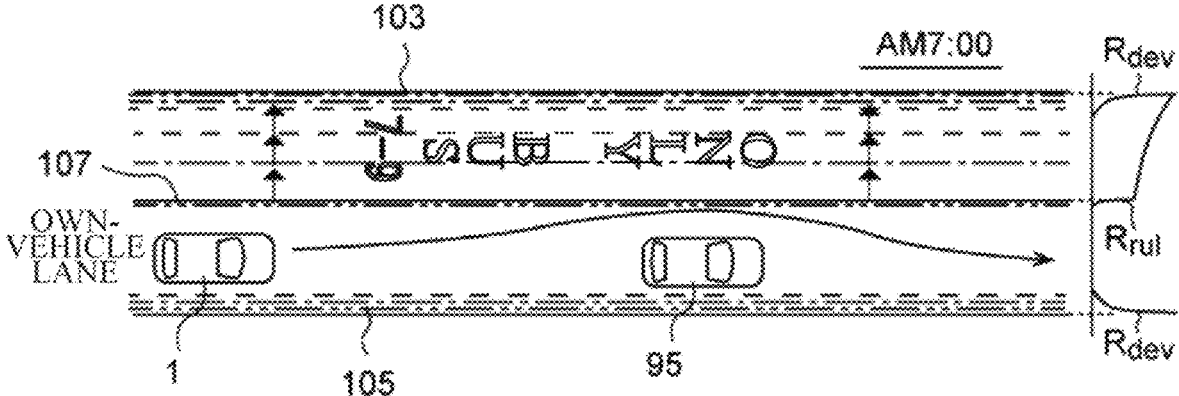

DRIVER ASSISTANCE APPARATUS, DRIVER ASSISTANCE PROCESSING METHOD, AND RECORDING MEDIUM

CROSS-REFERENCE TO RELATED APPLICATIONS

This application is the U.S. National Phase under 35 U.S.C. § 371 of International Application No. PCT/JP2023/019063, filed on May 23, 2023, the entire contents of which are hereby incorporated by reference.

TECHNICAL FIELD

The disclosure relates to a driver assistance apparatus, a driver assistance processing method, and a recording medium.

BACKGROUND ART

In recent years, research and development on automated driving technology and driver assistance technology have been advanced to prevent and reduce accidents and to reduce driving loads. For example, Patent Literature 1 discloses a method that is based on a concept of risk potential, as one algorithm for setting a traveling track and a speed of a vehicle in automated driving technology or driver assistance technology. The risk potential represents the magnitude of a risk of a collision of the vehicle with an obstacle on the track, or the magnitude of a risk of deviation of the vehicle from a road. These risks increase in their values as the obstacle comes closer to a road end. A controller sets a track and a speed having a low risk, based on a risk map generated by overlaying the risk potential set for respective obstacles and respective road ends.

Here, in a situation where a vehicle is to pass by a side of a parked vehicle parked on a road, for example, some drivers sufficiently decelerate the vehicle to pass by the side of the parked vehicle, and other drivers pass by the side of the parked vehicle without decelerating the vehicle. This means that a subjective risk differs for an individual driver even in the same situation. To address this, Non-Patent Literature 1 proposes a technique that is based on a concept of an allowable risk that differs for each driver. The allowable risk is a concept related to a vehicle speed. When the risk value in a traveling direction becomes higher than the allowable risk, the speed is reduced, and an area having a risk value less than or equal to the allowable risk is generated.

CITATION LIST

Patent Literature

Patent Literature 1: Japanese Unexamined Patent Application Publication No. 2022-083196

Non-patent Literature

Non-Patent Literature 1: Application of Driver Model Based on Feeling of Risk in Forward View to Automated Driving Control (Transactions of the Society of Automotive Engineers of Japan, Vol. 48, No. 3, pp. 763-769)

SUMMARY OF INVENTION

Problem to be Solved by the Invention

However, the technique disclosed in Non-Patent Literature 1 does not reflect measures to an intensity of a traffic rule and a temporal change in the traffic rule. Specifically, for example, there are various kinds of boundary lines having different degrees of allowance (traffic rule intensity) for protrusion over the boundary lines. In addition to the boundary lines, traffic restriction zones are set on roads. These traffic restriction zones have different degrees of allowance (traffic rule intensity) for entry into the traffic restriction zones, depending on the kinds of the traffic restriction zones. Most of the boundary lines and the traffic restriction zones are invariant ones set on the road; however, some traffic rules, such as a color of a traffic light and a bus-dedicated lane, temporally change even in the same traveling area.

For the technique disclosed in Non-Patent Literature 1 in which a single allowable risk is simply prepared for each driver, it is not possible to set a driving condition reflecting the intensity of a traffic rule and a temporal change in the traffic rule.

The invention has been made in view of the above concerns, and an object of the invention is to provide a driver assistance apparatus, a driver assistance processing method, and a recording medium that each make it possible to execute appropriate driver assistance control reflecting the intensity of a traffic rule and a temporal change in the traffic rule.

Means for Solving the Problem

In order to solve the above issues, an aspect of the invention provides a driver assistance apparatus configured to assist driving of a vehicle. The driver assistance apparatus includes one or more processors, and one or memories communicably coupled to the one or more processors. The one or more processors are configured to execute an acquisition process, a risk setting process, an allowable risk setting process, and a driving condition setting process. In the acquisition process, information on a surrounding environment of the vehicle is acquired. In the risk setting process, a rule deviation risk indicating a risk of deviation from a traffic rule related to travel of the vehicle is set for an object of the traffic rule, in accordance with one or both of an intensity of the traffic rule and an application time zone of the traffic rule. In the allowable risk setting process, a rule deviation allowable risk indicating a travel allowable area of the vehicle against the rule deviation risk. The rule deviation allowable risk being set higher in proportion to a magnitude of a vehicle speed of the vehicle. In the driving condition setting process, a target track and a target speed for automated driving of the vehicle are set based on the rule deviation risk and the rule deviation allowable risk, to cause the vehicle to travel in a location where the rule deviation allowable risk is higher than the rule deviation risk.

Further, in order to solve the above issues, another aspect of the invention provides a driver assistance processing method causing a computer to execute: acquiring information on a surrounding environment of a vehicle; setting a rule deviation risk indicating a risk of deviation from a traffic rule related to travel of the vehicle for an object of the traffic rule, in accordance with one or both of an intensity of the traffic rule and an application time zone of the traffic rule; setting a rule deviation allowable risk indicating a travel allowable area of the vehicle against the rule deviation risk, the rule deviation allowable risk being set higher in proportion to a magnitude of a vehicle speed of the vehicle; and setting a target track and a target speed for automated driving of the vehicle, based on the rule deviation risk and the rule deviation allowable risk, to cause the vehicle to travel in a location where the rule deviation allowable risk is higher than the rule deviation risk.

Further, in order to solve the above issues, another aspect of the invention provides a non-transitory tangible recording medium containing a computer program. The computer program causes a computer to execute: acquiring information on a surrounding environment of a vehicle; setting a rule deviation risk indicating a risk of deviation from a traffic rule related to travel of the vehicle for an object of the traffic rule, in accordance with one or both of an intensity of the traffic rule and an application time zone of the traffic rule; setting a rule deviation allowable risk indicating a travel allowable area of the vehicle against the rule deviation risk, the rule deviation allowable risk being set higher in proportion to a magnitude of a vehicle speed of the vehicle; and setting a target track and a target speed for automated driving of the vehicle, based on the rule deviation risk and the rule deviation allowable risk, to cause the vehicle to travel in a location where the rule deviation allowable risk is higher than the rule deviation risk.

Effects of the Invention

As described above, according to the invention, it is possible to execute appropriate driver assistance control reflecting the intensity of a traffic rule and a temporal change in the traffic rule.

BRIEF DESCRIPTION OF DRAWINGS

FIG. 1 is a schematic diagram illustrating a configuration example of a vehicle including a driver assistance apparatus according to a first embodiment of the disclosure.

FIG. 2 is a block diagram illustrating a configuration example of the driver assistance apparatus according to the first embodiment.

FIG. 3 is an explanatory diagram illustrating risk potential to be set for an object.

FIG. 4 is an explanatory diagram illustrating an example where an allowable risk is increased by lowering a vehicle speed.

FIG. 5 is an explanatory diagram illustrating an exemplary method of setting a traveling track and a vehicle speed, using a basic method of reflecting driver characteristics.

FIG. 6 is an explanatory diagram illustrating an exemplary method of setting a traveling track and a vehicle speed, using a basic method of reflecting driver characteristics.

FIG. 7 is an explanatory diagram illustrating an exemplary method of setting a traveling track and a vehicle speed using a basic method of reflecting driver characteristics.

FIG. 8 is an explanatory diagram illustrating an exemplary situation to which a driver assistance process according to the first embodiment is applicable.

FIG. 9 is an explanatory diagram illustrating a state of the risk potential in the situation illustrated in FIG. 8 as viewed in a traveling direction of the vehicle.

FIG. 10 is an explanatory diagram illustrating a collision risk as viewed in the traveling direction of the vehicle.

FIG. 11 is an explanatory diagram illustrating a rule deviation risk as viewed in the traveling direction of the vehicle.

FIG. 12 is an explanatory diagram illustrating a road deviation risk as viewed in the traveling direction of the vehicle.

FIG. 13 is an explanatory diagram illustrating an example where a traffic rule intensity is set for each kind of a boundary line and each kind of a traffic restriction zone.

FIG. 14 is an explanatory diagram illustrating an example where the rule deviation risk differs depending on the kind of the boundary line.

FIG. 15 is an explanatory diagram illustrating a zebra zone that is a buffer zone located before a point where a traveling zone of the vehicle changes into a two-lane traveling zone.

FIG. 16 is an explanatory diagram illustrating the rule deviation risk set for the zebra zone.

FIG. 17 is an explanatory diagram illustrating a collision allowable risk set for the collision risk.

FIG. 18 is an explanatory diagram illustrating a rule deviation allowable risk set for the rule deviation risk.

FIG. 19 is an explanatory diagram illustrating a road deviation allowable risk set for the road deviation risk.

FIG. 20 is an explanatory diagram illustrating the collision allowable risk and the rule deviation allowable risk to be set when the vehicle travels at a relatively low speed.

FIG. 21 is an explanatory diagram illustrating the collision allowable risk and the rule deviation allowable risk to be set when the vehicle travels at a relatively high speed.

FIG. 22 is an explanatory diagram illustrating a travel allowable area to be set for a driver who feels great resistance to protrusion into an oncoming lane in the situation illustrated in FIG. 8.

FIG. 23 is an explanatory diagram illustrating a travel allowable area to be set for a driver who feels great danger to contact with a parked vehicle in the situation illustrated in FIG. 8.

FIG. 24 is an explanatory diagram illustrating an example where the travel allowable area in which the collision allowable risk is higher than the collision risk and the rule deviation allowable risk is higher than the rule deviation risk is not formed.

FIG. 25 is an explanatory diagram illustrating an example where a traveling track is set on an oncoming lane side by setting the vehicle speed at a high speed in order to create a travel allowable area that is acceptable.

FIG. 26 is a flowchart of a learning process to be performed by the driver assistance apparatus according to the first embodiment.

FIG. 27 is a flowchart of the driver assistance process to be performed by the driver assistance apparatus according to the first embodiment.

FIG. 28 is a flowchart of a process of setting the risk potential and the allowable risk for a risk object on a road by the driver assistance apparatus according to the first embodiment.

FIG. 29 is a flowchart of a process of setting the risk potential and the allowable risk for an obstacle by the driver assistance apparatus according to the first embodiment.

FIG. 30 is a flowchart of a process of setting a target track and a target speed by the driver assistance apparatus according to the first embodiment.

FIG. 31 is an explanatory diagram illustrating a situation to which an example of a second embodiment of the disclosure is applicable.

FIG. 32 is a flowchart of a process of setting the risk potential and the allowable risk according to the example of the second embodiment.

FIG. 33 is an explanatory diagram illustrating a situation to which an example of a third embodiment of the disclosure is applicable.

FIG. 34 is an explanatory diagram illustrating an exemplary setting of the traffic rule intensity that changes in accordance with a lighting color of a traffic light.

FIG. 35 is an explanatory diagram illustrating a risk map at a time when the lighting color of the traffic light is green.

FIG. 36 is an explanatory diagram illustrating a risk map at a time when the lighting color of the traffic light is yellow.

FIG. 37 is an explanatory diagram illustrating a risk map at a time when the lighting color of the traffic light is red.

FIG. 38 is a flowchart of a process of setting the risk potential and the allowable risk according to the example of the third embodiment.

FIG. 39 is an explanatory diagram illustrating a risk map to be set five minutes before a start time of an application time zone of a bus-dedicated lane.

FIG. 40 is an explanatory diagram illustrating a risk map to be set two minutes before the start time of the application time zone of the bus-dedicated lane.

FIG. 41 is an explanatory diagram illustrating a risk map to be set at the start time of the application time zone of the bus-dedicated lane.

MODES FOR CARRYING OUT THE INVENTION

In the following, preferred embodiments of the invention will be described in detail with reference to the accompanying drawings. In the specification and the drawings, constituent elements having substantially the same functional configuration are denoted by the same reference numerals, and duplicated descriptions thereof will be omitted.

1. First Embodiment 1-1. Overall Configuration of Vehicle

First, a description is given of an exemplary overall configuration of a vehicle to which a driver assistance apparatus according to a first embodiment of the disclosure is applicable.

FIG. 1 is a schematic diagram illustrating a configuration example of a vehicle 1 including a driver assistance apparatus 50. The vehicle 1 illustrated in FIG. 1 is a two-wheel drive vehicle that transmits driving torque outputted from a driving power source 9 that generates driving torque of the vehicle, to left-front and right-front wheels. The driving power source 9 may be an internal combustion engine such as a gasoline engine or a diesel engine, may be a driving motor, or may include both an internal combustion engine and a driving motor.

Alternatively, the vehicle 1 may be a four-wheel drive vehicle that transmits driving torque to left-front, right-front, left-rear, and right-rear wheels. In this case, the vehicle 1 may be an electric automobile that includes two driving motors including, for example, a front-wheel driving motor and a rear-wheel driving motor, or may be an electric automobile that includes respective driving motors corresponding to the wheels. When the vehicle 1 is an electric automobile or a hybrid electric automobile, the vehicle 1 is equipped with a power generator such as a secondary battery that holds electric power to be supplied to the driving motors and a motor that generates electric power with which the secondary battery is to be charged, or a fuel battery.

The vehicle 1 includes the driving power source 9, an electric steering device 15, and a brake controller 16 as devices used for driving control of the vehicle 1. The driving power source 9 outputs driving torque that is to be transmitted to a front-wheel drive shaft 5F via a non-illustrated transmission and a front-wheel differential mechanism 7. Driving of the driving power source 9 and driving of the transmission are controlled by a vehicle controller 41 including one or more electronic control units (ECUs).

The front-wheel drive shaft 5F is provided with the electric steering device 15. The electric steering device 15 includes an electric motor and a gear mechanism that are not illustrated, and adjusts steering angles of the left-front wheel and the right-front wheel under the control by the vehicle controller 41. During manual driving, the vehicle controller 41 controls the electric steering device 15, based on a steering angle of a steering wheel 13 set by a driver. During automated driving, the vehicle controller 41 controls the electric steering device 15, based on a target steering angle set by the driver assistance apparatus 50.

The brake controller 16 controls a hydraulic pressure to be supplied to each of brake devices 17LF, 17RF, 17LR, and 17RR (hereinafter collectively referred to as brake devices 17) provided to the left-front, right-front, left-rear, and right-rear wheels, respectively. Each of the brake devices 17 is a device that applies a braking force to the corresponding wheel by, for example, holding a brake disc that rotates together with the wheel between brake pads using the hydraulic pressure thus supplied.

The brake controller 16 includes an electric motor pump that discharges a brake fluid, and a plurality of solenoid valves that adjust the hydraulic pressure to be supplied to the respective brake devices 17. The brake controller 16 adjusts the hydraulic pressure to be supplied to each of the brake devices 17 under the control by the vehicle controller 41, to thereby generate a predetermined braking force at each of the left-front, right-front, left-rear, and right-rear wheels. When the driving power source 9 includes a driving motor, hydraulic braking by the brake controller 16 is used in combination with regenerative braking by the driving motor.

The vehicle controller 41 includes one or more ECUs that control driving of the driving power source 9, driving of the electric steering device 15, and driving of the brake controller 16. The vehicle controller 41 may have functionality that controls driving of the transmission. The transmission changes an output outputted from the driving power source 9 and transmits the changed output to the wheels 3. The vehicle controller 41 is configured to acquire information transmitted from the driver assistance apparatus 50, and is configured to execute automated driving control of the vehicle 1.

Further, the vehicle 1 includes an in-vehicle imaging camera 21, front imaging cameras 23LF and 23RF, a vehicle-state sensor 25, a global navigation satellite system (GNSS) sensor 27, a map-data storage 29, and a notifier 43.

The in-vehicle imaging camera 21 captures an image of the inside of the vehicle 1 to generate image data. The in-vehicle imaging camera 21 includes an imaging device such as a charged coupled device (CCD) or a complementary metal-oxide-semiconductor (CMOS), and outputs the generated image data to the driver assistance apparatus 50. In the present embodiment, the in-vehicle imaging camera 21 is installed to capture an image of a driver who drives the vehicle 1.

The front imaging cameras 23LF and 23RF are each an example of a surrounding environment sensor that acquires data on a surrounding environment of the vehicle 1. The front imaging cameras 23LF and 23RF each capture an image of a front area ahead of the vehicle 1 to generate image data. The front imaging cameras 23LF and 23RF each include an imaging device such as a CCD or a CMOS, and output the generated image data to the driver assistance apparatus 50.

In the vehicle 1 illustrated in FIG. 1, the front imaging cameras 23LF and 23RF are left and right cameras paired into a stereo camera; however, the front imaging cameras 23LF and 23RF may be each a monocular camera. The vehicle 1 may include, for example, a rear imaging camera in addition to the front imaging cameras 23LF and 23RF. Further, the vehicle 1 may include, as the surrounding environment sensor, one or more sensors other than cameras, in addition to the front imaging cameras 23LF and 23RF. Examples of the sensors include a light detection and ranging (LiDAR) sensor, a millimeter-wave radar, and an ultrasonic sensor.

The vehicle-state sensor 25 includes one or more sensors that detect an operational state and a behavior of the vehicle 1. The vehicle-state sensor 25 includes, for example, one or more of a steering angle sensor, an accelerator position sensor, a brake stroke sensor, a brake pressure sensor, and an engine speed sensor, and detects the operational state of the vehicle 1 such as a steering angle of the steering wheel or a steered wheel, an accelerator position, a brake operation amount, or an engine speed. The vehicle-state sensor 25 includes, for example, one or more of a vehicle speed sensor, an acceleration sensor, and an angular speed sensor, and detects the behavior of the vehicle such as a vehicle speed, a longitudinal acceleration, a lateral acceleration, or a yaw rate. The vehicle-state sensor 25 outputs a sensor signal including detection data to the driver assistance apparatus 50.

The GNSS sensor 27 receives satellite signals transmitted from satellites of a positioning system represented by the global positioning system (GPS). The GNSS sensor 27 outputs position data of the vehicle 1 included in the received satellite signals to the driver assistance apparatus 50. The position data of the vehicle 1 is acquired as, for example, data on a latitude and a longitude. Alternatively, the GNSS sensor 27 may be a sensor that receives satellite signals from satellites of another positioning system that identifies the position of the vehicle 1, rather than the GPS sensor.

The map-data storage 29 is a recording medium, such as a hard disk drive (HDD), a compact disc (CD), a digital versatile disc (DVD), a solid state drive (SSD), a universal serial bus (USB) flash, or a storage device, and holds map data. The map data held in the map-data storage 29 includes data on a reference path that is a reference track for traveling on each road. The map-data storage 29 may be a recording medium that holds map data for a navigation system.

The notifier 43 is driven by the driver assistance apparatus 50, and presents various kinds of information to the driver by means of image displaying or audio outputting. The notifier 43 includes, for example, a display device disposed in an instrument panel, and a speaker disposed in the vehicle 1. The display may be a display of the navigation system. The notifier 43 may further include a head-up display (HUD) that superimposes an image on a surrounding landscape of the vehicle 1 on a windshield.

The driver assistance apparatus 50 executes control to assist driving of the vehicle 1. In the present embodiment, the driver assistance apparatus 50 causes the vehicle 1 to automatically travel, based on the information on the surrounding environment outputted from the surrounding environment sensor including the front imaging cameras 23LF and 23RF, the data on the operational state and behavior of the vehicle transmitted from the vehicle-state sensor 25, and the position data of the vehicle 1 transmitted from the GNSS sensor 27. Specifically, the driver assistance apparatus 50 acquires the data on the reference path held in the map-data storage 29, sets a driving condition for the vehicle 1 to prevent the vehicle 1 from coming into contact with a passer or an obstacle (hereinafter, the passer and the obstacle are collectively referred to as "obstacle(s)" unless otherwise specifically noted), and transmits a control command to the vehicle controller 41.

1-2. Driver Assistance Apparatus

Next, a specific description will be given of the driver assistance apparatus 50 according to the first embodiment of the disclosure.

The driver assistance apparatus 50 according to the present embodiment is configured to execute an acquisition process, a risk setting process, an allowable risk setting process, and a driving condition setting process. In the acquisition process, the information on the surrounding environment of the vehicle 1 is acquired. In the risk setting process, a rule deviation risk indicating a risk of deviation from a traffic rule related to travel of the vehicle 1 is set for an object of the traffic rule, based on a traffic rule intensity. In the allowable risk setting process, a rule deviation allowable risk indicating a travel allowable area of the vehicle 1 against the rule deviation risk is set higher in proportion to the magnitude of the vehicle speed of the vehicle 1. In the driving condition setting process, a target track and a target speed for the automated driving of the vehicle 1 are set based on the rule deviation risk and the rule deviation allowable risk, to cause the vehicle 1 to travel in a location where the rule deviation allowable risk is higher than the rule deviation risk.

FIG. 2 is a block diagram illustrating a configuration example of the driver assistance apparatus 50 according to the present embodiment. The driver assistance apparatus 50 serves as an apparatus that recognizes an object when one or more processors such as central processing units (CPUs) or graphics control units (GPUs) execute a computer program. The computer program is a computer program that causes the one or more processors to execute a later-described operation to be executed by the driver assistance apparatus 50. The computer program to be executed by the one or more processors may be held in a recording medium serving as a storage (a memory) provided in the driver assistance apparatus 50, in a recording medium incorporated in the driver assistance apparatus 50, or in any external recording medium attachable to the driver assistance apparatus 50.

Examples of the recording medium that holds the computer program may include a hard disk, magnetic media such as a floppy disk and a magnetic tape, optical recording media such as a CD-ROM, a DVD, and a Blu-ray (registered trademark), a magneto-optical medium such as a floppy disk, memories such as a RAM and a ROM, flash memories such as a USB memory and an SSD, and any other medium configured to hold programs.

Note that part or the entire of the driver assistance apparatus 50 may be updatable software such as firmware, or may be a program module or the like to be executed based on a command from the CPU or the like.

The in-vehicle imaging camera 21, the surrounding environment sensor 23, the vehicle-state sensor 25, the GNSS sensor 27, and the map-data storage 29 are coupled to the driver assistance apparatus 50 via a dedicated line or a communication means such as a controller area network (CAN) or a local interconnect network (LIN). Further, the vehicle controller 41 and the notifier 43 are coupled to the driver assistance apparatus 50. The driver assistance apparatus 50 is not limited to an ECU mounted on the vehicle 1, and may be a terminal device such as a smartphone or a wearable device. As illustrated in FIG. 2, the driver assistance apparatus 50 includes a processing unit 51, a storage 53, and a learned data storage 55.

1-2-1. Storage

The storage 53 is a memory such as a random access memory (RAM) or a read-only memory (ROM), or a recording medium such as a HDD, a CD, a DVD, an SSD, a USB flash, or a storage device. The storage 53 holds a software program to be executed by a calculation processor, various parameters to be used in calculation processing, acquired data, calculation results, and the like.

1-2-2. Learned Data Storage

The learned data storage 55 is an updatable recording medium such as a RAM, a HDD, a CD, a DVD, an SSD, a USB flash, or a storage device, and holds learned data learned by the processing unit 51. In the present embodiment, the learned data includes the following three allowable risks: a collision allowable risk indicating a travel allowable area against a risk of an obstacle around the vehicle (hereinafter, also referred to as a "collision risk") felt by the driver; a rule deviation allowable risk indicating a travel allowable area against a risk of deviation from the traffic rule (hereinafter also referred to as a "rule deviation risk") felt by the driver; and a road deviation allowable risk indicating a travel allowable area against a risk of protrusion from a road end (hereinafter also referred to as a "road deviation risk") felt by the driver.

The collision allowable risk, the rule deviation allowable risk, and the road deviation allowable risk are each given in the form of an expression representing a corresponding allowable risk that changes depending on a vehicle speed. Note that the collision allowable risk, the rule deviation allowable risk, and the road deviation allowable risk will be described in detail later.

1-2-2. Processor

The processing unit 51 includes one or more calculation processors (processors). The processing unit 51 executes various kinds of calculation processing by executing programs held in the storage 53. In the present embodiment, the processing unit 51 includes an obtainer 61, a surrounding environment detector 63, a learning processor 65, a risk setter 67, an allowable risk setter 69, a driving condition setter 71, and a notification processor 73. Some or all of these units are functionalities implemented by executing the programs by the calculation processor. However, some of the units included in the processing unit 51 may be hardware circuitry such as analog circuitry.

1-2-2-1. Obtainer

The obtainer 61 acquires information or data outputted from the in-vehicle imaging camera 21, the surrounding environment sensor 23, the vehicle-state sensor 25, and the GNSS sensor 27. The obtainer 61 acquires the information or data from the in-vehicle imaging camera 21, the surrounding environment sensor 23, the vehicle-state sensor 25, and the GNSS sensor 27 at respective appropriate time intervals. The obtainer 61 stores the acquired information and data as time-series data in the storage 53.

1-2-2-2. Surrounding Environment Detector

The surrounding environment detector 63 detects the surrounding environment of the vehicle 1, based on the information outputted from the surrounding environment sensor 23. Specifically, the surrounding environment detector 63 detects information on an obstacle and a road around the vehicle 1, based on the image data outputted from the front imaging cameras 23LF and 23RF and the detection data outputted from the LiDAR sensor, the radar sensor, or the like. Example of the obstacle include a person, another vehicle, a bicycle, a building, a natural object, and another obstacle present around the vehicle 1. The surrounding environment detector 63 calculates a position of the obstacle or the like with respect to the vehicle 1, and a distance and a relative speed between the vehicle 1 and the obstacle or the like.

Further, the information on the road includes information on a boundary line or a curbstone of a road end, a boundary line of a traveling zone, a kind (a color or a line form) of the boundary line, a travel restriction zone drawn on the road, and a kind of the travel restriction zone. The surrounding environment detector 63 calculates a distance from the vehicle 1 to the boundary line, the curbstone, or the travel restriction zone. The distance from the vehicle 1 to the boundary line, the curbstone, or the travel restriction zone includes an amount of protrusion (a distance of a negative value) of the vehicle 1 straddling the boundary line or the like. The surrounding environment detector 63 stores the information on the detected surrounding environment of the vehicle 1 as time-series data in the storage 53.

Note that the surrounding environment detector 63 may acquire information transmitted from a device outside the vehicle via a communication means such as vehicle-to-vehicle communication, road-to-vehicle communication, or a mobile communication network, to thereby identify part of the information on the obstacle around the vehicle 1. Further, the surrounding environment detector 63 may identify a position of the vehicle 1 on the map data using the position data of the vehicle 1 acquired by the GNSS sensor 27, to thereby identify the information on the obstacle or the like around the vehicle 1.

1-2-2-3. Learning Processor

The learning processor 65 learns the collision allowable risk, the rule deviation allowable risk, and the road deviation allowable risk for each driver, based on various kinds of data stored as the time-series data in the storage 53. In the present embodiment, the learning processor 65 learns the collision allowable risk, the rule deviation allowable risk, and the road deviation allowable risk, based on the information on the surrounding environment of the vehicle 1 detected by the surrounding environment detector 63 and the data on the operational state and behavior of the vehicle 1 outputted from the vehicle-state sensor 25.

Specifically, the learning processor 65 extracts the information on the surrounding environment of the vehicle 1 and the data on the operational state and behavior of the vehicle 1 that were obtained in a situation where the traveling track was corrected to secure a distance to obstacles while the vehicle 1 was manually driven by the driver of the vehicle 1. The information on the surrounding environment of the vehicle 1 includes, for example, data on kinds of the obstacles, a size of each obstacle, a distance to the obstacle, and a relative speed with respect to the obstacle. The information on the surrounding environment of the vehicle 1 further includes data on a road end, a kind of the boundary line or the travel restriction zone, and a distance to the road end, the boundary line, or the travel restriction zone. The data on the operational state and behavior of the vehicle includes data on a vehicle speed.

Based on the information on the surrounding environment of the vehicle 1 and the data on the operational state and behavior of the vehicle having been extracted, the learning processor 65 learns the collision allowable risk, the rule deviation allowable risk, and the road deviation allowable risk. The process of learning the collision allowable risk, the rule deviation allowable risk, and the road deviation allowable risk will be described in detail later.

1-2-2-4. Risk Setter

The risk setter 67 sets risk potential for a risk object included in the surrounding environment detected in the traveling direction of the vehicle 1. In the present embodiment, the risk setter 67 sets the collision risk indicating a risk of a collision with the obstacle, the rule deviation risk indicating a risk of deviation from a traffic rule related to travel of the vehicle 1, and the road deviation risk indicating a risk of protrusion of the vehicle 1 over the road end. The risk setter 67 sets the rule deviation risk for an object of the traffic rule, in accordance with the traffic rule intensity. The risk setting process to be performed by the risk setter 67 will be described in detail later.

1-2-2-5. Allowable Risk Setter

The allowable risk setter 69 sets the allowable risk corresponding to each driver recorded in the learned data storage 55 for each of the collision risk, the rule deviation risk, and the road deviation risk having been set by the risk setter 67. The allowable risk setter 69 sets the collision allowable risk indicating the travel allowable area of the vehicle 1 against the collision risk, and the road deviation allowable risk indicating the travel allowable area of the vehicle 1 against the road deviation risk. The collision allowable risk and the road deviation allowable risk are set lower in proportion to the magnitude of the vehicle speed of the vehicle 1. Further, the allowable risk setter 69 sets the rule deviation allowable risk indicating the travel allowable area of the vehicle 1 against the rule deviation risk. The rule deviation allowable risk is set higher in proportion to the magnitude of the vehicle speed of the vehicle 1. The allowable risk setting process by the allowable risk setter 69 will be described in detail later.

1-2-2-6. Driving Condition Setter

The driving condition setter 71 sets a driving condition for executing the automated driving control of the vehicle 1, and transmits information on the set driving condition to the vehicle controller 41. The driving condition setter 71 sets at least a target track and a target speed to prevent the vehicle 1 from coming into contact with the obstacle while the vehicle 1 is caused to automatically travel along a traveling route to a designated destination, and transmits a control command to the vehicle controller 41. In the present embodiment, the driving condition setter 71 sets the target track and the target speed of the vehicle 1, based on the risk map in which the collision risk, the rule deviation risk, and the road deviation risk are set for the surrounding environment of the vehicle 1. The driving condition setting process to be performed by the driving condition setter 71 will be described in detail later.

1-2-2-7. Notification Processor

The notification processor 73 controls notification to the driver by controlling driving of the notifier 43. In the present embodiment, the notification processor 73 notifies the driver of content of the set driving condition after the automated driving control of the vehicle 1 is performed in accordance with the driving condition set based on the risk map. For example, when the traveling track is shifted from the reference path to allow the vehicle 1 to pass by the side of a detected pedestrian, a notification is issued that indicates "the vehicle has passed to the left of the road to secure a distance to the pedestrian". When the vehicle speed is lowered, a notification is issued that indicates "the vehicle has been decelerated for the sake of pedestrian safety". These notifications are made, for example, by means of voice or displaying or both.

1-3. Operation Example of Driver Assistance Apparatus

Next, a description will be given of an operation example of the driver assistance apparatus 50 according to the present embodiment.

1-3-1. Method of Setting Driving Condition

First, a description is given of a method of setting the driving condition for the automated driving by the driving condition setter 71. In the following, a description is given first of an example of a basic concept of the method of setting the driving condition, following which a description is given of a method of reflecting the allowable risk level of each driver with respect to individual obstacles, protrusion from the road end, and deviation from the traffic rule in the driving condition.

Basic Concept

FIG. 3 is an explanatory diagram illustrating a risk (risk potential) to be set for a risk object. In FIG. 3, a pedestrian is illustrated as an example of the risk object. The risk potential has a value (a risk value) Ri that increases as the risk potential approaches the risk object (the pedestrian) and that is maximized in an existence area of the risk object. The risk value $R_i$ may be expressed as an exponential function with respect to a distance $x_i$ from the risk object and is represented by, for example, the following expression (1).

[Expression 1]

$$R_i = C_i \exp\left(-\frac{x_i - r_i}{\tau_i}\right) \tag{1}$$

$R_i$: Risk value
$C_i$: Absolute risk value (gain)
$x_i$: Distance from center of risk object
$\tau_i$: Gradient coefficient
$r_i$: Radius of risk object
i: Number for distinguishing risk object The absolute risk value $C_i$, which is a risk value at the time when the distance to the risk object ($x_i - r_i$) is zero, is set as a value dependent on the risk object, for each risk object. For example, if the risk object is a "pedestrian" or a "low-profile curbstone", the absolute risk value $C_i$ for the "pedestrian" is set to a value higher than the absolute risk value $C_i$ set for the "low-profile curbstone" assuming that the risk of a collision with the pedestrian is higher than the risk of a collision with the low-profile curbstone. The gradient coefficient $\tau_i$ may be set to a different value for each risk object or may be set to the same value regardless of the risk object.

During travel of the vehicle 1, the risk potential is set for each of the detected risk objects, and spatial overlaps of the respective risk potentials are added, to thereby generate the risk map taking into consideration the risks of collisions with obstacles. In such a risk map, the level of the risk may be indicated as a contour on a two-dimensional plane. Here, the risk map is assumed to have a risk value $R_{RM}$. Note that the risk value $R_{RM}$ has a two-dimensional distribution as described above. This allows for selection of a track having a low risk. At this time, the risk map may be calculated taking into consideration an invisible risk (a potential risk) in addition to a visible risk object. For example, when the vehicle 1 is to pass through a blind spot region at a corner of a road hidden by a cover, the potential risk may be set and reflected in the risk map assuming that a pedestrian will jump out from the blind spot region.

Basic Method of Reflecting Driver Characteristic

Here, the risks felt by the individual drivers are not necessarily the same as physical risks. For example, when traveling on a narrow residential road, some drivers feel a great risk to poles placed on the road, and other drivers feel a great risk to deviation from a traffic rule, such as protrusion over a boundary line of a traveling zone or a boundary line of a road end, or straddling a travel restriction zone. For this reason, in the present embodiment, the concept of an index of an allowable risk level (hereinafter, also referred to as an "allowable risk") for each driver is employed as a basic method of setting the traveling track. The concept is proposed in known literature, "Application of Driver Model Based on Feeling of Risk in Forward View to Automated Driving Control" (Transactions of the Society of Automotive Engineers of Japan, Vol. 48, No. 3, pp. 763-769).

Now, the basic method using the allowable risk will be briefly described. An allowable risk $U_a$ of the driver is assumed to be related to the vehicle speed V of an own vehicle and may be represented by the following expression (2).

[Expression 2]

$$U_a = W_a/V^2 \qquad (2)$$

$U_a$: Allowable risk
$w_a$: Gain
V: Vehicle speed

The value of the gain $w_a$ is a value set for each individual driver. The allowable risk $U_a$ represented by the expression (2) described above becomes a lower value as the vehicle speed V increases, and the risk allowable area becomes narrower accordingly. In other words, when the risk value $R_{RM}$ in the front area ahead of the vehicle in the traveling direction is higher than the allowable risk $U_a$, the allowable risk $U_a$ is increased by lowering the vehicle speed V, thereby creating an area in which the risk value $R_{RM}$ is less than the allowable risk $U_a$.

FIG. 4 is an explanatory diagram illustrating an example where the allowable risk $U_a$ is increased by lowering the vehicle speed V, and a travelable route is thereby secured. FIG. 4 is a diagram illustrating a risk map obtained by adding spatial overlaps between the risk potential of a side wall Z1 and the risk potential of a pedestrian Y1, for each of a case where the vehicle speed V is 30 km/h and a case where the vehicle speed V is 20 km/h, in cross-sectional view perpendicular to the traveling direction of the vehicle.

Note that, to facilitate understanding of the description, the own vehicle is regarded as a material point whose size is not drawn to scale in each cross-sectional view and each plan view of the risk map or the risk potential in the drawings subsequent to FIG. 4.

When the vehicle speed V is 30 km/h as illustrated in a left part of FIG. 4, the risk value $R_{RM}$ in the front area in the traveling direction is higher than the allowable risk $U_a$, and it is therefore not possible to set the traveling track for safety travel of the vehicle. In contrast, when the vehicle speed V is 20 km/h as illustrated in a right part of FIG. 4, the value of the allowable risk $U_a$ increases, and the area (travelable route) in which the risk value $R_{RM}$ is less than or equal to the allowable risk $U_a$ is generated in the front area in the traveling direction. Such adjustment of the vehicle speed V allows the traveling track to be set on the travelable route.

FIGS. 5 to FIG. 7 are explanatory diagrams each illustrating an exemplary method of setting the traveling track and the vehicle speed, using a basic method of reflecting driver characteristics. When the vehicle 1 is to travel along a traveling route to a designated destination, data on a reference path Pr of a current traveling road is acquired by referring to the map data stored in advance. When the vehicle 1 is to travel on a road on which the side wall Z1 is present on a left side as illustrated in FIG. 5, the reference path Pr is set as-is as a selected path Pc as long as the allowable risk $U_a$ corresponding to a current vehicle speed V (=30 km/h) is higher than the risk value $R_{RM}$ in the front area in the traveling direction on the acquired reference path Pr.

Further, as illustrated in FIG. 6, in a case where the vehicle 1 is to pass by the side of a pole Z2 on a right side of the same road and where the allowable risk $U_a$ corresponding to the current vehicle speed V (=30 km/h) is less than the risk value $R_{RM}$ in the front area in the traveling direction on the acquired reference path Pr, a location closest to the reference path Pr within the travelable route in which the allowable risk $U_a$ is higher than or equal to the risk value $R_{RM}$ is set as the selected path Pc.

Further, when the vehicle 1 is to pass by the side of the pedestrian Y1 on the right side on the same road as illustrated in FIG. 7, the risk value $R_{RM}$ of the pedestrian Y1 is set to be high. Thus, even when the pedestrian Y1 illustrated in FIG. 7 is present at the same distance from the vehicle as the pole Z2 illustrated in FIG. 6 is, there is no travelable route in which the allowable risk $U_a$ corresponding to the current vehicle speed V (=30 km/h) is higher than or equal to the risk value $R_{RM}$. In such a case, the allowable risk $U_a$ is increased by lowering the vehicle speed V of the own vehicle (V=20 km/h). The travelable route in which the allowable risk $U_a$ is higher than or equal to the risk value $R_{RM}$ is thereby created and the selected path Pc is set.

Method of Reflecting Allowable Risk for Each Driver According to Embodiment

The description has been given so far of the basic method of setting the driving condition by the driving condition setter 71. Here, as illustrated in FIG. 8, in a situation where the vehicle 1 is to pass by a side of a parked vehicle 100 parked in a first traveling zone (an own lane) in which the vehicle 1 travels, some drivers who feel danger (the collision risk) to contact with the parked vehicle 100 are assumed to select a track 81 that largely protrudes over a boundary line (a center line) 101 into a second traveling zone (an oncoming lane) adjacent to the first traveling zone. In addition, other drivers who feel resistance to deviation from the rule (the route deviation risk) such as protrusion over the boundary line 101 into the oncoming lane are assumed to select a track 83 having a minimum protrusion amount. The above-described basic method, which uses only the single expression representing the allowable risk $U_a$ for each driver, is not able to reflect the concept of the allowance for the rule deviation risk.

In contrast, in the present embodiment, the risk object is divided into the collision risk, the rule deviation risk, and the road deviation risk. Further, the collision allowable risk, the rule deviation allowable risk, and the road deviation allowable risk each reflecting the allowable risk of the driver are set for the collision risk, the rule deviation risk, and the road deviation risk, respectively. Note that, in the present embodiment, protrusion over the boundary line 101 into the oncoming lane and protrusion over a road end 103 or 105 into a sidewalk or a road side zone are regarded as risks different from each other, and are distinguished from each other as the rule deviation risk and the road deviation risk, respectively. However, these risks may be regarded as common deviation risks, and a common deviation allowable risk may be set for each of the risks.

FIGS. 9 to FIG. 12 are explanatory diagrams each illustrating the risk potential to be set in the situation illustrated in FIG. 8. FIG. 9 illustrates a state in which a position of the parked vehicle 90 in the situation illustrated in FIG. 8 is viewed in the traveling direction of the vehicle 1. FIG. 10 is an explanatory diagram illustrating a collision risk $R_{col}$ set for the parked vehicle 90 as viewed in the traveling direction of the vehicle 1. FIG. 11 is an explanatory diagram illustrating a rule deviation risk $R_{rul}$ set for the boundary line 101 as viewed in the traveling direction of the vehicle 1. FIG. 12 is an explanatory diagram illustrating a road deviation risk $R_{dev}$ set for the road ends 103 and 105 as viewed in the traveling direction of the vehicle 1.

The risk setter 67 sets the collision risk $R_{col}$, the rule deviation risk $R_{rul}$, and the road deviation risk $R_{dev}$ for the parked vehicle 90, the boundary line 101, and the road ends 103 and 105 detected by the surrounding environment sensor 23, respectively. The risk value of the collision risk $R_{col}$ illustrated in FIG. 10 increases as the vehicle 1 approaches the parked vehicle 90, and is maximized within an existence area of the parked vehicle 90. The risk value of the rule deviation risk $R_{rul}$ illustrated in FIG. 11 increases as the vehicle 1 approaches the boundary line 101 in an area close to the boundary line 101, and gradually increases as the vehicle 1 moves away from the boundary line 101 over the boundary line 101. The risk value of the road deviation risk $R_{dev}$ illustrated in FIG. 12 increases as the vehicle 1 approaches each of the road ends 103 and 105, and is maximized at the positions of the road ends 103 and 105.

The values of the collision risk $R_{col}$, the rule deviation risk $R_{rul}$, and the road deviation risk $R_{dev}$ may be values preset in accordance with the risk object. For example, the collision risk $R_{col}$ and the road deviation risk $R_{dev}$ may be set using the expression (1) described above. In addition, a risk value of the rule deviation risk $R_{rul}$ within the area of the own lane may be set using the expression (1) described above. Further, a risk value of the rule deviation risk $R_{rul}$ within the area of the oncoming lane may be set to have any gradient.

In the present embodiment, the rule deviation risk $R_{rul}$, in particular, is set in accordance with the traffic rule intensity. The term "traffic rule intensity" refers to the intensity of a constraint of a traffic rule to be complied with, or the level of danger that occurs when the traffic rule is violated. For example, in the case of the boundary line 101 of the traveling zone, the degree of allowance for straddling the boundary line 101 becomes lower, i.e., the traffic rule intensity becomes higher in the following order: a broken line, a white line, and an orange line. The traffic rule intensity may be also defined in accordance with a kind of the travel restriction zone such as a zebra zone (a buffer zone). For example, the zebra zone is not a zone into which entry of the vehicle 1 is prohibited but is a zone in which the entry of the vehicle 1 is undesirable. However, some zebra zones are surrounded by, for example, orange edge lines, which means no-entry regions. As described above, the degree of allowance for the entry of the vehicle 1 into the travel restriction zone differs depending on the kind of the travel restriction zone, and the traffic rule intensity may be defined to each kind of the travel restriction zone.

In the present embodiment, the traffic rule intensity is preset in accordance with the kind of the risk object for which the rule deviation risk $R_{rul}$ is to be set. One or both of the maximum value $C_i$ of the risk value and a risk object area $r_i$ in the above-described expression (1), and further, the gradient of the risk value within the area into which the vehicle 1 straddling the boundary line 101 or the boundary of the travel restriction zone protrudes are set in accordance with the kind of the risk object and the traffic rule intensity. For example, as the traffic rule intensity is higher, the maximum value $C_i$ of the risk value or the risk object area $r_i$ is set larger, and further, the gradient of the risk value within the area into which the vehicle 1 straddling the boundary line 101 or the boundary line of the travel restriction zone protrudes is set larger. This enables to set a target track reflecting the traffic rule intensity.

FIG. 13 illustrates an example where the traffic rule intensity is set for each kind of the boundary line 101 and each kind of the traffic restriction zone. Note that the boundary line 101 includes not only the boundary line (the center line) between the own lane (the first traveling zone) and the oncoming lane (the second traveling zone), but also a boundary line between an own-vehicle traveling zone (the first traveling zone) having two or more lanes on each side and an adjacent traveling zone (the second traveling zone).

In the setting example illustrated in FIG. 13, the traffic rule intensity is set to "low" when the boundary line 101 is a broken line. The traffic rule intensity is set to "medium" when the boundary line 101 is a white line and when the traffic restriction zone is a zebra zone. The traffic rule intensity is set to "high" when the boundary line 101 is an orange line and when the traffic restriction zone is a no-entry zone.

FIG. 14 is an explanatory diagram illustrating an example where the rule deviation risk $R_{rul}$ differs depending on the kind of the boundary line 101. FIG. 14 illustrates a rule deviation risk $R_{rul\_wh}$ in the case of the boundary line 101 being a white line, and a rule deviation risk $R_{rul\_or}$ in the case of the boundary line 101 being an orange line. The orange line indicates higher restriction against the protrusion than the white line does. Accordingly, a risk value (a maximum value) of the rule deviation risk $R_{rul\_or}$ on the boundary line 101 to be set for the orange line is higher than a risk value (a maximum value) of the rule deviation risk $R_{rul\_wh}$ on the boundary line 101 to be set for the white line, and the risk object area is also set larger accordingly. Further, a gradient of the risk value of the rule deviation risk $R_{rul\_or}$ on the oncoming lane side to be set for the orange line is set larger than a gradient of the risk value of the rule deviation risk $R_{rul\_wh}$ on the oncoming lane side to be set for the white line.

FIGS. 15 and FIG. 16 are explanatory diagrams each illustrating an example where a rule deviation risk $R_{rul\_zz}$ is set for a zebra zone as the travel restriction zone. FIG. 15 is an explanatory diagram illustrating a zebra zone that is a buffer zone located before a point where the traveling zone of the vehicle 1 changes to a two-lane traveling zone, and FIG. 16 illustrates the rule deviation risk $R_{rul\_zz}$ set for the zebra zone. The rule deviation risk $R_{rul\_zz}$ illustrated in FIG. 16 has a risk value that increases as the vehicle 1 approaches a boundary between the own lane and the zebra zone, and becomes constant within an existence area of the zebra zone. Further, in an area on the oncoming lane side beyond the zebra zone, the risk value further increases as the vehicle 1 moves away from the zebra zone. This means that the risk value becomes higher as the amount of entry into the oncoming lane becomes larger.

Thereafter, as illustrated in FIGS. 17 to 19, the allowable risk setter 69 sets a collision allowable risk $U_{col}$, a rule deviation allowable risk $U_{rul}$, and a road deviation allowable risk $U_{dev}$ for the collision risk $R_{col}$, the rule deviation risk $R_{rul}$, and the road deviation risk $R_{dev}$, respectively. The collision allowable risk $U_{col}$, the rule deviation allowable risk $U_{rul}$, and the road deviation allowable risk $U_{dev}$ are represented by the following expressions (3) to (5) respectively.

[Expression 3]

$$U_{col} = W_{col}/V^2 \qquad (3)$$

$U_{col}$: Collision allowable risk
$w_{col}$: Gain
V: Vehicle speed

[Expression 4]

$$U_{rul} = W_{rul} * V \qquad (4)$$

$U_{rul}$: Rule deviation allowable risk
$w_{rul}$: Gain
V: Vehicle speed

[Expression 5]

$$U_{dev} = W_{dev}/V^2 \qquad (5)$$

$U_{dev}$: Road deviation allowable risk
$w_{dev}$: Gain
V: Vehicle speed

The collision allowable risk $U_{col}$ and the road deviation allowable risk $U_{dev}$ are inversely proportional to the square of the speed V of the vehicle 1. Accordingly, when a track is to be set close to the obstacle or the road end, the collision allowable risk $U_{col}$ and the road deviation allowable risk $U_{dev}$ are increased by lowering the vehicle speed V. This enables to achieve careful driving when the vehicle 1 approaches the obstacle or travels on a narrow road. The rule deviation allowable risk $U_{rul}$ is proportional to the speed of the vehicle 1. Accordingly, when a track protruding into the oncoming lane is to be set, the rule deviation allowable risk $U_{rul}$ is increased by increasing the vehicle speed V as the amount of protrusion into the oncoming lane becomes larger. This enables to achieve driving in which the state of protruding over the boundary line 101 is promptly cancelled.

FIGS. 20 and 21 are explanatory diagrams each illustrating a difference in the travel allowable area caused by a difference in the allowable risk. FIG. 20 illustrates the collision allowable risk $U_{col}$ and the rule deviation allowable risk $U_{rul}$ to be set when the vehicle 1 travels at a relatively low speed. FIG. 21 illustrates the collision allowable risk $U_{col}$ and the rule deviation allowable risk $U_{rul}$ to be set when the vehicle 1 travels at a relatively high speed. To facilitate understanding, illustrations of the road deviation risk $R_{dev}$ and the road deviation allowable risk $U_{dev}$ having no direct effect are omitted in each of FIGS. 20 and 21.

As illustrated in FIG. 20, when the vehicle 1 travels at a low speed, a travel allowable area Px in which the collision allowable risk $U_{col}$ is higher than the collision risk $R_{col}$ and the rule deviation allowable risk $U_{rul}$ is higher than the rule deviation risk $R_{rul}$ is limited to an area of the own lane close to the parked vehicle 90. In contrast, as illustrated in FIG. 21, when the vehicle 1 travels at a high speed, a travel allowable area Py in which the collision allowable risk $U_{col}$ is higher than the collision risk $R_{col}$ and the rule deviation allowable risk $U_{rul}$ is higher than the rule deviation risk $R_{rul}$ is an area extending in a direction away from the parked vehicle 90 and including the oncoming lane.

The collision allowable risk $U_{col}$, the rule deviation allowable risk $U_{rul}$, and the road deviation allowable risk $U_{dev}$ represented by the respective expressions (3) to (5) described above are learned by the learning processor 65, based on data on the manual driving by the driver in respective situations (driving scenes). For example, the learning processor 65 performs least squares fitting processing, using the collision risk $R_{col}$, the rule deviation risk $R_{rul}$, the road deviation risk $R_{dev}$, and the expressions (3) to (5) respectively representing the collision allowable risk $U_{col}$, the rule deviation allowable risk $U_{rul}$, and the road deviation allowable risk $U_{dev}$, based on the information on the surrounding environment of the vehicle 1 and the data on the operational state and behavior of the vehicle collected in the situation where the vehicle 1 passed by the side of the parked vehicle 90 as illustrated in FIG. 8, to thereby learn the respective gains $W_{col}$, $W_{rul}$, and $W_{dev}$ of the expressions (3) to (5).

Specifically, the learning processor 65 identifies a traveling scene in which the driver operated the steering wheel, the accelerator pedal, or the brake pedal to secure a distance to the obstacle, based on the information on the surrounding environment of the vehicle 1 and the data on the operational state and behavior of the vehicle 1 detected during the manual driving. The learning processor 65 sets, as input data, data on the distance between the vehicle 1 and the obstacle or the like, a vehicle speed, and the amount of protrusion (protrusion amount) over the boundary line (the center line) in the identified traveling scene. In this case, the distance between the vehicle 1 and the obstacle or the like is the distance between the vehicle 1 and the obstacle or the like in a direction orthogonal to the traveling direction of the vehicle 1 passing by the side of the obstacle. In this case, the distance between the vehicle 1 and the obstacle or the like also includes a distance from the vehicle 1 to a road end.

Based on the input data identified, the learning processor 65 learns the respective gains $W_{col}$, $W_{rul}$, and $W_{dev}$ of the expressions (3) to (5) representing the collision allowable risk $U_{col}$, the rule deviation allowable risk $U_{rul}$, and the road deviation allowable risk $U_{dev}$, respectively. Accordingly, it is possible to set the travel allowable area that is acceptable for each of the driver who feels great resistance to the protrusion into the oncoming lane and the driver who feels great danger to contact with the parked vehicle 90. At this time, the learning processor 65 distinguishes the kind of the boundary line 101 or the kind of the travel restriction zone, and learns the expression (4) representing the rule deviation allowable risk $U_{rul}$ for the rule deviation risk $R_{rul}$ that is to be set for each risk object. It is therefore possible to set the travel allowable area reflecting the allowable risk of the driver that is variable also depending on the traffic rule intensity.

FIGS. 22 and 23 each illustrate an example where the collision risk $R_{col}$ is set for the parked vehicle 90, and the rule deviation risk $R_{rul}$ is set for the boundary line 101 in the situation illustrated in FIG. 8. FIG. 22 illustrates a travel allowable area Pa set for a driver A who feels great resistance to protrusion into the oncoming lane. FIG. 23 illustrates a travel allowable area Pb set for a driver B who feels great danger to contact with the parked vehicle 90.

When being manually driven by the driver A who feels great resistance to the protrusion into the oncoming lane, the vehicle 1 is decelerated to pass by the side of the parked vehicle 90 to minimize the amount of protrusion into the oncoming lane. In this case, the collision allowable risk $U_{col}$ is set to a relatively high value corresponding to low-speed traveling, and the rule deviation allowable risk $U_{rul}$ is set to a relatively low value corresponding to the low-speed traveling. Accordingly, when being automatically driven to pass by the side of the parked vehicle 90, the speed of the vehicle 1 is set to a relatively low speed, and the traveling track is set so as to extend through the travel allowable area Pa on the own lane.

In contrast, when being manually driven by the driver B who feels great danger to contact with the parked vehicle 90, the vehicle 1 largely protrudes into the oncoming lane to pass by the side of the parked vehicle 90. In this case, the collision allowable risk $U_{col}$ is set to a relatively low value corresponding to high-speed traveling, and the rule deviation allowable risk $U_{rul}$ is set to a relatively high value corresponding to the high-speed traveling. Accordingly, when being automatically driven to pass by the side of the parked vehicle 90, the speed of the vehicle 1 is set to a relatively high speed, and the traveling track is set so as to extend through the travel allowable area Pb on the oncoming lane. Note that, because the vehicle speed is set to a high speed, the time for the vehicle 1 to travel on the oncoming lane is shortened, and the vehicle 1 is thus quickly returned to the own lane.

Noted that, in the case of the driver who feels great resistance to both an approach to an obstacle and deviation from the rule, both of the collision allowable risk $U_{col}$ and the rule deviation allowable risk $U_{rul}$ decrease in some cases. In this case, as illustrated in FIG. 24, the travel allowable area in which the collision allowable risk $U_{col}$ is higher than the collision risk $R_{col}$ and the rule deviation allowable risk $U_{rul}$ is higher than the rule deviation risk $R_{rul}$ is not formed, in some cases.

In such a case, as illustrated in FIG. 25, in order to create the travel allowable area that is acceptable, the driving condition setter 71 sets the vehicle speed to a higher speed and sets the traveling track on the oncoming lane side. This allows the vehicle 1 to quickly travel through the oncoming lane, which shortens a duration time of the rule deviation state. At this time, in the present embodiment, the road deviation risk $R_{dev}$ is set for the road end, and the road deviation allowable risk $U_{dev}$ is set for the road deviation risk $R_{dev}$. The road deviation allowable risk $U_{dev}$ becomes a lower value as the vehicle speed becomes higher, which moves the travel allowable area of the vehicle 1 away from the road end. This makes it possible to restrict the amount of protrusion of the vehicle 1 into the oncoming lane, using the road deviation allowable risk $U_{dev}$.

In this way, the driving condition setter 71 sets the driving condition reflecting not only the physical risk level of the obstacle to which the driver feels a risk but also the collision allowable risk, the rule deviation allowable risk, and the road deviation allowable risk for each driver. This makes it possible to achieve appropriate automated driving control in various traveling scenes, in accordance with the risk felt by an individual driver with respect to the detected obstacles. As a result, it is possible to achieve safety automated driving for the individual driver, and to improve reliability of the automated driving control.

1-3-2. Processing Operation

Next, an exemplary processing operation of the driver assistance apparatus 50 will be described by way of an example case where the driving condition that causes the vehicle to pass by the side of the parked vehicle is set. The description is given individually for the learning process and the driver assistance process. In the following description, a detailed description will be omitted for duplicated part of the above-described description.

1-3-2-1. Learning Process

FIG. 26 is a flowchart of the learning process.

First, the learning processor 65 detects the face of the driver, based on the image data transmitted from the in-vehicle imaging camera 21, generates identification information for distinguishing the driver by quantitative analysis of facial features or the like, and sets the identification information in the learned data storage 55 (Step S11). This allows the data to be learned to be associated with the specific identification information, and to be identified as learned data of the driver. The identification information for distinguishing the driver may be inputted by the driver.

Thereafter, the learning processor 65 determines whether the vehicle 1 is being manually driven by the driver (Step S13). For example, the learning processor 65 determines whether the vehicle 1 is being manually driven by the driver by acquiring a signal or a message indicating a driving mode status from the vehicle controller 41. If determining that the vehicle 1 is not being manually driven by the driver (S13: NO), the learning processor 65 repeats the determination at Step S13 until the vehicle 1 is determined as being manually driven.

In contrast, if determining that the vehicle 1 is being manually driven by the driver (S13: YES), the learning processor 65 acquires the information on the surrounding environment of the vehicle 1 detected by the surrounding environment detector 63 and the data on the operational state and behavior of the vehicle 1 detected by the vehicle-state sensor 25 (Step S15).

Thereafter, the learning processor 65 determines whether the vehicle 1 has corrected the traveling track to secure a distance to the obstacle, based on the acquired information on the surrounding environment of the vehicle 1 and the data on the operational state and behavior of the vehicle 1 (Step S17). For example, the learning processor 65 determines that the vehicle 1 has corrected the traveling track to secure the distance to the obstacle, when the vehicle 1 changes a traveling position in the traveling zone or performs steering operation to take a roundabout route to avoid the obstacle present in front of the vehicle 1 in the traveling zone of the vehicle 1 (the own lane) before and after passing by the side of the obstacle. However, the method of determining whether the vehicle 1 has corrected the traveling track to secure the distance to the obstacle is not particularly limited.

If determining that the vehicle 1 has not corrected the traveling track to secure the distance to the obstacle (S17: NO), the process returns to Step S13, and the learning processor 65 repeats the processing in each of the steps described above. In contrast, if determining that the vehicle 1 has corrected the traveling track to secure the distance to the obstacle (S17: YES), the learning processor 65 records the information on the surrounding environment of the vehicle 1 and the data on the operational state and behavior of the vehicle 1 upon the correction of the traveling track of the vehicle 1 (Step S19). Specifically, the learning processor 65 records the data on the distance between the vehicle 1 and the obstacle, the kind of the obstacle, the speed of the vehicle 1, the kind of the boundary line or the kind of the travel restriction zone, the amount of protrusion (protrusion amount) of the vehicle 1 from the own lane over the boundary line, the amount of entry (protrusion amount) of the vehicle 1 from the own lane into the travel restriction zone, and the distance from the vehicle 1 to the road end that are obtained when the vehicle 1 passes by the side of the obstacle. The data to be recorded may include information other than the data described above.

Thereafter, the learning processor 65 determines whether a predetermined number of data items have been accumulated (Step S21). For example, the learning processor 65 determines whether the number of times of determining that the vehicle 1 has corrected the traveling track to secure the distance to the obstacle and storing the data has reached a predetermined number of times. Alternatively, the learning processor 65 may determine that the predetermined number of data items have been accumulated when a predetermined time has elapsed, or may determine that the predetermined number of data has been accumulated for each driving cycle from the start to the end of driving of the vehicle 1.

If determining that the predetermined number of data items have not been accumulated (S21: NO), the process returns to Step S13, and the learning processor 65 repeats the processing in each of the steps described above. In contrast, if determining that the predetermined number of data items have been accumulated (S21: YES), the learning processor 65 learns the respective expressions (3) to (5) representing the collision allowable risk $U_{col}$, the rule deviation allowable risk $U_{rul}$, and the road deviation allowable risk $U_{dev}$ (Step S23). Specifically, the learning processor 65 performs the least squares fitting processing, using the collision risk $R_{col}$, the rule deviation risk $R_{rul}$, the road deviation risk $R_{dev}$, and the expressions (3) to (5) respectively representing the collision allowable risk $U_{col}$, the rule deviation allowable risk $U_{rul}$, and the road deviation allowable risk $U_{dev}$, based on the information on the surrounding environment of the vehicle 1 and the data of the operational state and behavior of the vehicle 1 having been accumulated. The learning processor 65 thereby learns the respective gains $W_{col}$, $W_{rul}$, and $W_{dev}$ of the expressions (3) to (5).

At this time, the learning processor 65 learns the gain $W_{rul}$ of the expression (4) representing the rule deviation allowable risk $U_{rul}$ for each kind of the boundary line 101 and for each kind of the traffic restriction zone present around the vehicle 1 in the situation where the vehicle 1 passed by the side of the obstacle.

Thereafter, the learning processor 65 stores, in the learned data storage 55, the expressions (3) to (5) representing the learned collision allowable risk $U_{col}$, the learned rule deviation allowable risk $U_{rul}$, and the learned road deviation allowable risk $U_{dev}$, respectively, in association with the identification information of the driver (Step S25). The learning processor 65 stores, in the learned data storage 55, the expression (4) representing the rule deviation allowable risk $U_{rul}$ for each kind of the boundary line 101 and for each kind of the traffic restriction zone.

In this way, the learning processor 65 learns the allowable risk felt by each driver with respect to each risk object, based on the data collected during the manual driving of the vehicle by each driver, and stores the data on results of learning in the learned data storage 55.

1-3-2-2. Driver Assistance Process

FIGS. 27 to 30 are flowcharts for describing an operation of the driver assistance process. FIG. 27 illustrates a main routine of the driver assistance process.

First, when a driving system of the vehicle 1 is started up (Step S31), the driving condition setter 71 executes a process of identifying the driver of the vehicle 1 (Step S33). Specifically, the driving condition setter 71 detects the face of the driver, based on the image data transmitted from the in-vehicle imaging camera 21, and identifies the driver and the identification information of the driver by the quantitative analysis of facial features or the like. This makes it possible to identify which learned data to be referred to. Note that the information for identifying the driver who is currently performing the driving operation may be information inputted by the driver.

Thereafter, the driving condition setter 71 determines whether the vehicle 1 is being automatically driven (Step S35). For example, the driving condition setter 71 determines whether the vehicle 1 is being automatically driven by acquiring a signal or a message indicating the driving mode status from the vehicle controller 41. If determining that the vehicle 1 is not being automatically driven (S35: NO), the driving condition setter 71 repeats the determination at Step S35.

In contrast, if determining that the vehicle 1 is being automatically driven (S35: YES), the driving condition setter 71 acquires the information on the road in the traveling direction of the vehicle 1 (Step S37). Specifically, the driving condition setter 71 acquires a position and a kind of the boundary line between the first traveling zone in which the vehicle 1 travels and the second traveling zone adjacent to the first traveling zone, a position and a kind of the travel restriction zone, and a position and a kind of the road end, based on the information on the surrounding environment detected by the surrounding environment detector 63. The kind of the road end refers to a boundary line, a curbstone, a guardrail, or the like that defines the road end.

Thereafter, the risk setter 67 and the allowable risk setter 69 set the risk potential and the allowable risk, respectively, for a risk object included in the acquired information on the road (Step S39). FIG. 28 illustrates a flowchart of a process of setting the risk potential and the allowable risk for the risk object on the road.

First, the risk setter 67 sets the rule deviation risk $R_{rul}$ and the road deviation risk $R_{dev}$ preset in accordance with the kind of the risk object for each risk object on the road (Step S51). Specifically, the risk setter 67 sets the rule deviation risk $R_{rul}$ and the road deviation risk $R_{dev}$ that are preset in accordance with the respective kinds of the detected boundary line, the detected travel restriction zone, and the detected road end, for the boundary line, the travel restriction zone, and the road end. In particular, the risk setter 67 determines the kind of the boundary line or the kind of the travel restriction zone, and sets the rule deviation risk $R_{rul}$ preset in accordance with the traffic rule intensity corresponding to the kind of the boundary line or the kind of the travel restriction zone.

Thereafter, the allowable risk setter 69 sets the allowable risk for each risk potential having been set (Step S53). Specifically, the allowable risk setter 69 selects, from among the expressions (3) to (5) representing the respective allowable risks stored in the learned data storage 55 in association with the identification information of the driver, the expression (4) representing the rule deviation allowable risk $U_{rul}$ for each risk object for which the rule deviation risk $R_{rul}$ has been set, and the expression (5) representing the road deviation allowable risk $U_{dev}$ for each risk object for which the road deviation risk $R_{dev}$ has been set. Further, the allowable risk setter 69 sets the selected expression (4) representing the rule deviation allowable risk $U_{rul}$ for the corresponding rule deviation risk $R_{rul}$ and sets the selected expression (5) representing the road deviation allowable risk $U_{dev}$ for the corresponding road deviation risk $R_{dev}$.

Returning back to FIG. 27, the driving condition setter 71 then acquires information on obstacles in the traveling direction of the vehicle 1 (Step S41). Specifically, the driving condition setter 71 acquires information on an oncoming vehicle, a parked vehicle, a pedestrian, a bicycle, a building, a telegraph pole, a traffic light, and other three-dimensional objects, based on the information on the surrounding environment detected by the surrounding environment detector 63. The information on the obstacles includes at least data on a kind of each obstacle, a size of each obstacle, a distance to each obstacle, and a relative speed with respect to each obstacle.

Thereafter, the risk setter 67 and the allowable risk setter 69 set the risk potential and the allowable risk, respectively, for the detected obstacle (Step S43). FIG. 29 illustrates a flowchart of a process of setting the risk potential and the allowable risk for the obstacle.

First, the risk setter 67 sets, for each obstacle, the collision risk $R_{col}$ preset in accordance with the kind of the obstacle (Step S61). Thereafter, the allowable risk setter 69 sets the expression (3) representing the collision allowable risk $U_{col}$ for each set collision risk $R_{col}$ (Step S63). Specifically, the allowable risk setter 69 selects, from among the expressions (3) to (5) representing the allowable risks stored in the learned data storage 55 in association with the identification information of the drivers, the expression (3) representing the collision allowable risk $U_{col}$ for each obstacle for which the collision risk $R_{col}$ has been set. Further, the allowable risk setter 69 sets the expression (3) representing the selected collision allowable risk $U_{col}$ for each corresponding collision risk $R_{col}$.

Returning back to FIG. 27, the driving condition setter 71 then sets the target track and the target speed of the vehicle 1 (Step S45). FIG. 30 illustrates a flowchart of a process of setting the target track and the target speed.

First, the driving condition setter 71 defines cross-sections perpendicular to the route at points set at constant intervals on the reference path on which the vehicle 1 is scheduled to travel (Step S71). Specifically, the driving condition setter 71 acquires data on the reference path that is a reference traveling route for traveling on a current traveling road by acquiring information on a current position of the vehicle 1 outputted from the GNSS sensor 27 and referring to the map-data storage 29. Further, the driving condition setter 71 defines cross-sections perpendicular to the route at the positions of the points set on the reference path. Each cross-section includes information on the collision risk $R_{col}$, the rule deviation risk $R_{rul}$, and the road deviation risk $R_{dev}$ (see FIG. 22, for example). The points may be set on the reference path at a constant distance interval or a distance interval corresponding to a constant traveling time at a current vehicle speed.

Thereafter, the driving condition setter 71 determines whether there is an area in which the vehicle 1 is allowed to travel at the current vehicle speed on each cross-section (Step S73). Specifically, the driving condition setter 71 calculates the collision allowable risk $U_{col}$, the rule deviation allowable risk $U_{rul}$, and the road deviation allowable risk $U_{dev}$ in accordance with the current vehicle speed V using the expressions (3) to (5) set for the collision risk $R_{col}$, the rule deviation risk $R_{rul}$, and the road deviation risk $R_{dev}$, respectively. As described above, the collision allowable risk $U_{col}$ and the road deviation allowable risk $U_{dev}$ become lower values as the vehicle speed V becomes higher, and the rule deviation allowable risk $U_{rul}$ becomes a higher value as the vehicle speed V becomes higher.

The driving condition setter 71 determines, for each cross-section, whether the area (the travel allowable area) in which the collision allowable risk $U_{col}$ is higher than the collision risk $R_{col}$, the rule deviation allowable risk $U_{rul}$ is higher than the rule deviation risk $R_{rul}$, and the road deviation allowable risk $U_{dev}$ is higher than the road deviation risk $R_{dev}$ is present.

If determining that the area in which the vehicle 1 is allowed to travel at the current vehicle speed is present on each cross-section (S73: YES), the driving condition setter 71 sets a location closest to the point on the reference path, within the travel allowable area on each cross-section, as a target track on the cross-section (Step S79). In this case, the driving condition setter 71 sets the current vehicle speed V as the target speed. This makes it possible to achieve traveling on the traveling track having a low risk to be felt by the driver while maintaining the current vehicle speed V.

In contrast, if determining that the area in which the vehicle 1 is allowed to travel at the current vehicle speed is not present on each cross-section (S73: NO), that is, when the area in which the vehicle 1 is allowed to travel at the current vehicle speed is not present on any of the cross-sections, the driving condition setter 71 increases or decreases the current vehicle speed V at a constant interval (Step S75). Here, the driving condition setter 71 does not increase or decrease an actual vehicle speed V, but increases or decreases an assumed vehicle speed. The interval in increasing and decreasing the vehicle speed is set to any predetermined value (e.g., 5 km/h). The interval in increasing and decreasing the vehicle speed may be variable depending on the current vehicle speed V, and may be set to a different value depending on whether the vehicle speed is to be increased or decreased. In addition, whether the vehicle speed is to be increased or decreased may be determined by, for example, whether a travelable area is to be increased.

Thereafter, the driving condition setter 71 determines whether an area in which the vehicle 1 is allowed to travel at an increased vehicle speed or a decreased vehicle speed is present (Step S77). Specifically, the driving condition setter 71 calculates the collision allowable risk $U_{col}$, the rule deviation allowable risk $U_{rul}$, and the road deviation allowable risk $U_{dev}$ that correspond to the increased vehicle speed V or the decreased vehicle speed V, using the expressions (3) to (5) set for the collision risk $R_{col}$, the rule deviation risk $R_{rul}$, and the road deviation risk $R_{dev}$, respectively.

The driving condition setter 71 determines, for each cross-section, whether the area (the travel allowable area) in which the collision allowable risk $U_{col}$ is higher than the collision risk $R_{col}$, the rule deviation allowable risk $U_{rul}$ is higher than the rule deviation risk $R_{rul}$, and the road deviation allowable risk $U_{dev}$ is higher than the road deviation risk $R_{dev}$ is present.

If the driving condition setter 71 determines that the area in which the vehicle 1 is allowed to travel at the increased vehicle speed or the decreased vehicle speed is present (S77: NO), the process returns to Step S75, and the vehicle speed is repeatedly increased or decreased until it is determined that the area in which the vehicle 1 is allowed to travel at the increased vehicle speed or the decreased vehicle speed is present. Thereafter, if determining that the area in which the vehicle 1 is allowed to travel at the increased vehicle speed or the decreased vehicle speed is present (S77: YES), the driving condition setter 71 sets the location closest to the point on the reference path, within the travel allowable area on each respective cross-section, as the target track on the cross-section (Step S79). In this case, the driving condition setter 71 sets the current vehicle speed V obtained after the increase or decrease as the target speed. This makes it possible to achieve traveling on the traveling track having a low risk to be felt by the driver and at the vehicle speed V having a low risk to be felt by the driver.

Returning back to FIG. 27, the driving condition setter 71 outputs information on the set target track and the set target speed to the vehicle controller 41 (Step S47). After acquiring the information on the target track and the target speed, the vehicle controller 41 sets control target values of an acceleration speed, a deceleration speed, and a steering angular speed of the vehicle 1, based on the information on the target track and the target speed, and controls driving of the driving power source 9, the electric steering device 15, and the brake controller 16. This allows the vehicle 1 to automatically travel on the traveling track reflecting the allowable risk of the driver and at the vehicle speed reflecting the allowable risk of the driver.

Thereafter, the driving condition setter 71 determines whether the driving system of the vehicle 1 has been stopped (Step S49). If determining that the driving system of the vehicle 1 has not been stopped (S49: NO), the process returns to the Step S35, and the driving condition setter 71 repeatedly executes the steps described above. In contrast, if determining that the driving system of the vehicle 1 has been stopped (S49: YES), the driving condition setter 71 ends the routine of the driver assistance process.

1-4. Effect of Driver Assistance Apparatus According to Embodiment

As described above, according to the driver assistance apparatus 50 of the present embodiment, the rule deviation risk indicating the risk of deviation from the traffic rule related to travel of the vehicle 1, the collision allowable risk for the collision risk, and the rule deviation allowable risk for the rule deviation allowable risk are set in addition to the collision risk to be felt by the driver with respect to the surrounding obstacles, and the driving condition for the automated driving of the vehicle 1 is set. The rule deviation risk to be set and the rule deviation allowable risk to be set are set for each of the risk objects having different levels of traffic rule intensity.

Accordingly, when the traveling track is to be changed to secure the distance between the vehicle 1 and the obstacle, it is possible to set the driving condition in accordance with the traffic rule intensity. For example, as the traffic rule intensity becomes higher, the rule deviation risk becomes higher, and a higher priority is given to operation of reducing the rule deviation risk. It is therefore possible to achieve the driver assistance system that gives a sense of security and a sense of reliability to the driver. This urges the driver to continuously use the driver assistance system.

Further, the rule deviation allowable risk is set higher in proportion to the magnitude of the vehicle speed. Therefore, when a target track having a large degree of deviation from the rule is to be set to secure a large distance to the obstacle, the target vehicle speed is set to a large value. This achieves traveling that enables to shorten the duration time of the rule deviation state. Further, the collision allowable risk is set lower in proportion to the magnitude of the vehicle speed. Therefore, when a target track close to an obstacle is to be set, the target vehicle speed is set to a low value. This achieves safely and secured travel of the vehicle.

In addition, the collision allowable risk to be set is set using the calculation expression learned based on the data collected during the manual driving by the driver, and the risks to be felt by the individual driver with respect to the distance to the obstacle and the passing speed are reflected on the collision allowable risk. Further, the rule deviation allowable risk to be set is set in accordance with the traffic rule intensity using the calculation expression learned, based on the data collected during the manual driving by the driver. The rule deviation allowable risk thus reflects the risk to be felt by the individual driver with respect to deviation from the traffic rule.

Accordingly, when the traveling track is to be changed to secure the distance between the vehicle 1 and the obstacle, it is possible to set the driving condition reflecting the risk to be felt by the driver, in accordance with the obstacle or the traffic rule intensity. For example, as the driver feels a higher risk with respect to deviation from the traffic rule, the rule deviation allowable risk becomes lower, and a higher priority is given to the operation of reducing the rule deviation risk. It is therefore possible to achieve the driver assistance system that gives a sense of security and a sense of reliability in accordance with the characteristic of each driver. This urges the driver to continuously use the driver assistance system.

Further, in the present embodiment, the road deviation risk is set separately from the collision risk and the rule deviation risk, and the driving condition of the vehicle 1 is set using the road deviation allowable risk set lower in proportion to the magnitude of the vehicle speed. This makes it possible to set the driving condition reflecting the risk to be felt by the driver with respect to protrusion of the vehicle 1 from the road end into the sidewalk or the road side zone.

Further, according to the driver assistance apparatus 50 of the present embodiment, the learning processor 65 learns the respective expressions representing the collision allowable risk, the rule deviation allowable risk, and the road deviation allowable risk, based on the data collected during the manual driving of the vehicle, and stores the expressions in the learned data storage 55. Accordingly, the learned data is automatically accumulated while the driver is manually driving the vehicle 1. It is therefore possible to accumulate, with high accuracy, the learned data on the characteristics that have appeared during the manual driving by the driver and affected the recognition of the risk, and to improve the accuracy of the control condition to be set.

2. Second Embodiment

Next, the driver assistance apparatus 50 according to a second embodiment of the disclosure will be described.

In the first embodiment, the rule deviation risk and the rule deviation allowable risk are set, and the driving condition of the vehicle 1 is set in accordance with the traffic rule intensity, with each of the degree of allowance for the straddling the boundary line of the traveling zone or the degree of allowance for the entry into the travel restriction zone set as the traffic rule intensity. In the second embodiment, an example applicable to a situation where the traffic rule intensity spatially changes on the traveling route of the vehicle 1 will be described.

FIG. 31 is an explanatory diagram illustrating a situation to which the example of the present embodiment is applicable. FIG. 31 illustrates a situation where a vehicle 1a to be assisted travels in a first traveling zone on one traveling lane of a road having two lanes on each side and intends to overtake another vehicle 91a traveling at a low speed in the first traveling zone. The vehicle 1a and the other vehicle 91a, a vehicle 1b and another vehicle 91b, and a vehicle 1c and another vehicle 91c indicate respective positions of the vehicle 1a and the other vehicle 91a at same time periods.

An intersection is located in front of the vehicle 1a, and the first traveling zone is a traveling zone that allows vehicles to travel straight through the intersection. A second traveling zone (an overtaking lane) adjacent to the first traveling zone is a traveling zone that allows vehicles to turn right at the intersection. A boundary line between the first traveling zone and the second traveling zone changes from a white broken line 101a to an orange line 101b before the intersection. That is, the boundary line between the first traveling zone and the second traveling zone changes along the traveling direction of the vehicle 1a, and the traffic rule intensity spatially changes accordingly.

In such a situation, the driver assistance apparatus 50 of the vehicle 1 sets the allowable risk for the second traveling zone to cause the vehicle 1a to complete overtaking before the boundary line changes from the white broken line 101a to the orange line 101b. Specifically, for example, the driver assistance apparatus 50 sets a passing completion point at a position where the boundary line changes from the white broken line to the orange line, and calculates a target overtaking route. Accordingly, a traveling distance of the vehicle 1a in the second traveling zone from a point where the vehicle 1a is to enter the second traveling zone to a point where the vehicle 1a is to leave the second traveling zone is calculated.

Further, the driver assistance apparatus 50 calculates a target vehicle speed of the vehicle 1a that allows the vehicle 1a to travel on the overtaking route without contacting the other vehicle 91a, based on the traveling distance in the second traveling zone and a speed of the other vehicle 91a. That is, the target vehicle speed for traveling in the second traveling zone is calculated to cause the vehicle 1a to return to the first traveling zone without contacting the other vehicle 91a. The target vehicle speed obtained here is substituted into the expression (4) representing the rule deviation allowable risk, to thereby obtain the rule deviation allowable risk for the second traveling zone.

The example of the present embodiment is also applicable to a situation where a blind spot exists at a curve or the like on either a right side or a left side of the road in front of the vehicle 1a in the traveling direction, and where the other vehicle 91a is traveling at a low speed in front of the vehicle 1a on a traveling zone (i.e., the first traveling zone in the above-described example) opposite to the zone in which the blind spot exists.

FIG. 32 illustrates a flowchart of a process of setting the risk potential and the allowable risk according to an example of the present embodiment.

First, the risk setter 67 sets the rule deviation risk $R_{rul}$ and the road deviation risk $R_{dev}$ preset in accordance with the kind of the risk object for each risk object on the road, in a manner similar to that in Step S51 of the flowchart illustrated in FIG. 28 (Step S51).

Thereafter, the risk setter 67 determines whether the vehicle 1a is in a situation to overtake a moving obstacle (Step S54). If the risk setter 67 determines that the vehicle 1a is not in the situation to overtake the moving obstacle (S54: NO), the process proceeds to Step S53. In Step S53, the allowable risk setter 69 sets the allowable risk for each set risk potential in a manner similar to that in Step S51 of the flowchart illustrated in FIG. 28 (Step S53). That is, this case corresponds to the situation to overtake a static obstacle, and the risk potential and the allowable risk are set according to the flowchart illustrated in FIG. 28.

In contrast, when the risk setter 67 determines that the vehicle 1a is in the situation to overtake the moving obstacle (the other vehicle 91a) (S54: YES), the allowable risk setter 69 determines whether an overtaking prohibition point or a point with poor visibility is present at the point where the vehicle 1a is to return to the current traveling lane (the first traveling zone) after the overtaking (Step S55). For example, the allowable risk setter 69 determines whether the overtaking prohibition point or the point with poor visibility is present at the point where the vehicle 1a is to return to the current traveling lane after the overtaking, based on the information on the surrounding environment outputted from the surrounding environment sensor 23, or based on the position data of the vehicle 1a and the map data acquired by the GNSS sensor 27.

If the allowable risk setter 69 determines that the overtaking prohibition point or the point with poor visibility is not present at the point where the vehicle 1a is to return to the current traveling lane after the overtaking (S55: NO), the process proceeds to Step S53, and the allowable risk is set for each set risk potential, as in the case of overtaking a static obstacle. In contrast, if determining that the overtaking prohibition point or the point with poor visibility is present at the point where the vehicle 1a is to return to the current traveling lane after the overtaking (S55: YES), the allowable risk setter 69 calculates a speed necessary to complete the overtaking before the overtaking prohibition point or the point with poor visibility, based on a distance to the overtaking prohibition point or the point with poor visibility and the moving speed of the object to overtake (Step S56).

Specifically, the allowable risk setter 69 sets the point where the vehicle 1a is to complete overtaking without contacting the obstacle at a point located before the overtaking prohibition point or the point with poor visibility, and calculates the target overtaking route. In addition, the allowable risk setter 69 calculates the traveling distance of the vehicle 1a in the second traveling zone on the overtaking route from the point where the vehicle 1a is to enter the second traveling zone adjacent to the current traveling lane to the point where the vehicle 1a is to leave the second traveling zone. Further, the allowable risk setter 69 calculates the speed necessary for the vehicle 1a to travel on the overtaking route without contacting the other vehicle 91a, based on the traveling distance of the vehicle 1a in the second traveling zone and the speed of the other vehicle 91a.

Thereafter, the allowable risk setter 69 adjusts the gain $W_{rul}$ of the expression (4) representing the rule deviation allowable risk to cause the target speed of the vehicle 1a to become the necessary speed (Step S57).

Thereafter, the allowable risk setter 69 sets the allowable risk for each set risk potential (Step S53). At this time, the rule deviation allowable risk $U_{rul}$ to be set for the rule deviation risk $R_{rul}$ having been set for the boundary line between the first traveling zone and the second traveling zone is obtained by substituting the target speed (the necessary speed) into the expression (4) to which the gain $W_{rul}$ obtained in Step S57 is applied. Accordingly, even when a route entering an adjacent lane is to be traced to overtake a moving obstacle, it is possible to set the driving condition that causes the vehicle 1a to complete the overtaking before reaching the overtaking prohibition point or the point with poor visibility.

As described above, according to the example of the present embodiment, it is possible, in a situation where the traffic rule intensity spatially changes on the traveling route of the vehicle 1, to set the driving condition that enables the vehicle 1 to complete the overtaking before the traffic rule changes, based on the presumption that the traffic rule intensity will change. It is therefore possible to achieve the driver assistance system that gives a sense of security and a sense of reliability to the drivers. This urges the driver to continuously of the driver assistance system.

3. Third Embodiment

Next, the driver assistance apparatus 50 according to a third embodiment of the disclosure will be described.

In the second embodiment, the example applicable to the situation where the traffic rule intensity spatially changes has been described. In the third embodiment, an example applicable to a situation where the traffic rule intensity temporally changes will be described.

FIG. 33 illustrates an exemplary situation to which the present embodiment is applicable. In a situation considered here, the vehicle 1 traveling on a lane 113 is to turn right at an intersection and enter a lane 115 after turning right. The risk at the intersection changes in association with a stepwise change in lighting color of a traffic light 111. Specifically, the rule deviation risk at the intersection increases stepwise as the lighting color of the traffic light changes from green (a first color) indicating permission for passage of the vehicle 1 to red (a second color) indicating prohibition against passage of the vehicle 1 in one step or a plurality of steps.

The basic method described in the first embodiment does not reflect a concept addressing such a temporal change in the traffic rule. Specifically, if the allowable risk represented by the expression (2) described above is used, the target speed is lowered or the vehicle 1 is stopped before entering an area in which the risk value is high. Accordingly, when the lighting color of the traffic light 111 changes from yellow to red after the vehicle 1 enters the intersection, the vehicle 1 travels at a low speed or stops in the intersection.

In the present embodiment, the traffic rule intensity is preset in accordance with the lighting color of the traffic light 111, and the maximum value $C_i$ of the risk value to be set at the intersection is set in accordance with the traffic rule intensity, based on the expression (1) described above. When the traffic rule temporally changes, a speed dependency of the rule deviation allowable risk is changed in accordance with a positional relationship between the vehicle 1 and an application area of the traffic rule, thereby enabling the vehicle 1 to travel following the traffic rule.

FIG. 34 illustrates an exemplary setting of the traffic rule intensity that changes in accordance with a lighting color of the traffic light 111. In the exemplary setting illustrated in FIG. 34, the traffic rule intensity is set to "low" when the lighting color of the traffic light 111 is green. The traffic rule intensity is set to "medium" when the lighting color of the traffic light 111 is yellow. The traffic rule intensity is set to "high" when the lighting color of the traffic light is red. The traffic rule intensity determined in accordance with the lighting color of the traffic light 111 corresponds to a level of the rule deviation risk to be set at the intersection.

FIGS. 35 to FIG. 37 illustrate changes in the risk map occurring when the lighting color of the traffic light 111 temporally changes from green to yellow and from yellow to red. In these illustrated examples, the rule deviation risk to be set at the intersection is set to an overlapping area of intersecting roads. Note that an illustration of a crosswalk is omitted in FIGS. 35 to FIG. 37.

When the lighting color of the traffic light 111 is green, the rule deviation risk to be set at the intersection is "low" (FIG. 35). When the lighting color of the traffic light 111 changes to yellow, the rule deviation risk to be set at the intersection changes to "medium" (FIG. 36). Note that, when a traffic light on a side of a pedestrian 117 starts blinking while the lighting color of the traffic light 111 is green, the rule deviation risk may be gradually increased. Further, when the lighting color of the traffic light 111 changes to red, the rule deviation risk to be set at the intersection changes to "high".

When the vehicle 1 is present before the intersection, the allowable risk setter 69 sets the road deviation allowable risk represented by the expression (5) described above for the rule deviation risk set at the intersection to enable the determination as to whether the vehicle 1 is allowed to enter the intersection to be made in accordance with the lighting color of the traffic light 111. The allowable risk inversely proportional to the speed of the vehicle 1 that is going to enter the intersection is thereby set, and the driving condition that decelerates or stops the vehicle 1 is set in accordance with the rule deviation risk having been set at the intersection in accordance with the lighting color of the traffic light 111.

In contrast, when the vehicle 1 has already entered the intersection as illustrated in FIG. 35, the allowable risk setter 69 sets the rule deviation allowable risk represented by the expression (4) described above for the rule deviation risk set at the intersection. Accordingly, when the rule deviation risk set at the intersection becomes higher than the rule deviation allowable risk in association with a change in the lighting color of the traffic light 111 from green to yellow and from yellow to red, the allowable risk setter 69 increases the rule deviation allowable risk by increasing the set speed of the vehicle 1. That is, it is possible for a person to determine to quickly come out of the rule deviation state in which the vehicle 1 is located at the intersection even after the lighting color of the traffic light 111 changes to red.

FIG. 38 illustrates a flowchart of a process of setting the risk potential and the allowable risk according to an example of the present embodiment.

First, the risk setter 67 sets the rule deviation risk $R_{rul}$ and the road deviation risk $R_{dev}$ preset in accordance with the kind of the risk object for a static risk object present on the road in a manner similar to that in Step S51 of the flowchart illustrated in FIG. 28 (Step S51). The term "static risk object" refers to a risk object of which traffic rule does not temporally change, such as a specific kind of a boundary line or a curbstone indicating a road boundary.

Thereafter, the risk setter 67 sets the rule deviation risk $R_{rul}$ for a dynamic risk object present on the road, based on a current state (Step S53). The term "dynamic risk object" refers to a risk object of which traffic rule temporally changes, such as an intersection at which the result of the determination as to whether the vehicle 1 is allowed to enter changes in accordance with the lighting color of the traffic light 111 described above. In the above-described case where the vehicle 1 passes through the intersection, the predetermined rule deviation $R_{rul}$ preset in accordance with a current present lighting color of the traffic light 111 is set.

Note that the driver assistance apparatus 50 may be configured to cause, for example, the front imaging cameras 23LF and 23RF to recognize the lighting color of the traffic light 111, or may be configured to acquire the lighting color of the traffic light 111 by means of, for example, road-to-vehicle communication.

Thereafter, the allowable risk setter 69 sets the allowable risk for each set risk potential (Step S53). At this time, the allowable risk is set for the rule deviation risk having been set for the dynamic risk object, in accordance with the speed of the vehicle 1 and the positional relationship between the risk object and the vehicle 1. In the above-described example where the vehicle 1 passes through the intersection, when the vehicle 1 is at a position before the intersection to enter, the road deviation allowable risk $U_{dev}$ corresponding to the vehicle speed is set for the rule deviation risk having been set at the intersection, based on the expression (5) described above. As a result, the driving condition that allows the vehicle 1 to come closer to the intersection as the vehicle speed decreases and that decelerates or stops the vehicle 1 is set in accordance with the lighting color of the traffic light 111.

In contrast, when the vehicle 1 has entered the intersection, the rule deviation allowable risk $U_{rul}$ corresponding to the vehicle speed is set for the rule deviation risk having been set at the intersection, based on the expression (4) described above. Accordingly, it is necessary to increase the vehicle speed as the rule deviation risk $R_{rul}$ set at the intersection increases, in order to cause the rule deviation allowable risk $U_{rul}$ to become higher than the rule deviation risk $R_{rul}$. Therefore, the driving condition is set that allows the vehicle 1 to quickly leave the intersection when the lighting color of the traffic light 111 changes from yellow to red.

As described above, according to the example of the present embodiment, in the situation where the traffic rule intensity temporally changes on the traveling route of the vehicle 1, it is possible to set the driving condition that allows the vehicle 1 to come out of the rule deviation state more quickly as the traffic rule intensity increases. It is therefore possible to achieve the driver assistance system that gives a sense of security and a sense of reliability to drivers. This urges the driver to continuously use the driver assistance system.

Another Application Example of Present Embodiment

The situation to which the example of the driver assistance process according to the present embodiment is applicable is not limited to the above-described situation where the vehicle 1 is to pass through the intersection. For example, the example of the driver assistance process according to the present embodiment is applicable also to a situation where the vehicle 1 is to travel in a specific vehicle priority traveling zone for which an application time zone of the traffic rule is set.

FIGS. 39 to 41 each illustrate a situation where the vehicle 1 travels on a lane adjacent to a bus-dedicated lane for which an application time zone is set, and intends to overtake another vehicle 95 traveling ahead. In FIGS. 39 to 41, the rule deviation risk $R_{rul}$ is set for a boundary line 107 of a traveling zone, and the road deviation risk $R_{dev}$ is set for each of road ends 103 and 105. In addition, the rule deviation risk $R_{rul}$ is set for the bus-dedicated lane, in accordance with a margin of time from a current time to the application time zone of the bus-dedicated lane. In each drawing, a risk map representing the set rule deviation risk $R_{rul}$ and the road deviation risk $R_{dev}$ in a two-dimensional manner is illustrated, and the rule deviation risk $R_{rul}$ and the road deviation risk $R_{dev}$ in a cross-section perpendicular to the route are illustrated in a right part of each drawing.

The application time zone of the bus-dedicated lane is AM 7:00 to AM 9:00, and FIGS. 39 to 41 illustrate the risk map to be set five minutes before (AM 6:55) a start time of the application time zone of the bus-dedicated lane, the risk map to be set two minutes before (AM 6:58) the start time of the application time zone of the bus-dedicated lane, and the risk map to be set at the start time (AM 7:00), respectively. The driver assistance apparatus 50 is configured to cause, for example, the front imaging cameras 23LF and 23RF to recognize a sign printed on a road surface. Alternatively, the driver assistance apparatus 50 may acquire information on the bus-dedicated lane and the application time zone, based on a current position and the map data of the vehicle 1, or may communicate with an external information processing apparatus to acquire the information on the bus-dedicated lane and the application time zone.

When there is a sufficient margin of time from the current time to the application time zone of the bus-dedicated lane, entry of the vehicle 1 into the bus-dedicated lane is not restricted, and the degree of allowance for straddling the boundary line 107 is high. Accordingly, as illustrated in FIG. 39, the rule deviation risk set for the bus-dedicated lane is zero, and the rule deviation risk $R_{rul}$ set for the boundary line 107 is a low value. In this situation, since the risk potentials of the own lane and the bus-dedicated lane are the same, the allowable risk setter 69 sets the learned rule deviation allowable risk $U_{rul}$ and the learned road deviation allowable risk $U_{dev}$ for the set rule deviation risk $R_{rul}$ and the set road deviation risk $R_{dev}$, respectively, regardless of a traveling position of the vehicle 1. This allows a traveling track of the vehicle 1 to be set at a position close to the reference path within the area in which the rule deviation allowable risk $U_{rul}$ is higher than the rule deviation risk $R_{rul}$ and the road deviation allowable risk $U_{dev}$ is higher than the road deviation risk $R_{dev}$, and allows the vehicle 1 to overtake the other vehicle 95.

When it gets closer to an effective time of the bus-dedicated lane, the rule deviation risk $R_{rul}$ having a positive value is set for the bus-dedicated lane while the rule deviation risk $R_{rul}$ having been set for the boundary line 107 is maintained, as illustrated in FIG. 40, in order to prevent the vehicle 1 from entering the bus-dedicated lane. Further, when the effective time of the bus-dedicated lane has come, the rule deviation risk $R_{rul}$ set for the boundary line 107 and the rule deviation risk $R_{rul}$ set for the bus-dedicated lane increase, as illustrated in FIG. 41, in order to restrict the entry of the vehicle 1 into the bus-dedicated lane. That is, the risk setter 67 sets the rule deviation risk $R_{rul}$ to be set for the bus-dedicated lane higher as the current time approaches the application time zone of the bus-dedicated lane.

In this situation, when the vehicle 1 is traveling on the own lane, the allowable risk setter 69 sets the learned rule deviation allowable risk $U_{rul}$ and the learned road deviation allowable risk $U_{dev}$ for the rule deviation risk $R_{rul}$ having been set for the boundary line 107 and the road deviation risk $R_{dev}$ having been set for the road end 105, respectively. This allows the traveling track of the vehicle 1 to be set at the position close to the reference path within the area in which the rule deviation allowable risk $U_{rul}$ is higher than the rule deviation risk $R_{rul}$ and and the road deviation allowable risk $U_{dev}$ is higher than the road deviation risk $R_{dev}$.

In contrast, when the vehicle 1 is traveling on the bus traveling lane, the allowable risk setter 69 sets the learned rule deviation allowable risk $U_{rul}$ and the learned road deviation allowable risk $U_{dev}$ for the rule deviation risk $R_{rul}$ having been set for the boundary line 107 and the road deviation risk $R_{dev}$ having been set for the road end 105, respectively. In addition, the allowable risk setter 69 sets the rule deviation allowable risk $U_{rul}$ for the rule deviation risk $R_{rul}$ having been set for the bus-dedicated lane, based on the expression (4) described above. Accordingly, when the rule deviation risk $R_{rul}$ is higher than the rule deviation allowable risk $U_{rul}$ at the traveling position of the vehicle 1, the allowable risk setter 69 increases the set speed of the vehicle 1 to increase the rule deviation allowable risk $U_{rul}$. That is, it is possible for a person to determine to quickly come out of the rule deviation state in which the vehicle 1 travels on the bus-dedicated lane.

Although some preferred embodiments of the invention have been described so far with reference to the accompanying drawings, the invention is by no means limited to the embodiments described above. It is apparent that modifications and alterations may be made by persons having ordinary knowledge in a technical field to which the invention belongs to within the scope of the technical concept set forth in the claims. It is naturally appreciated that these modifications and alterations also belong to the technical field of the invention.

For example, in the foregoing embodiment, the example where the driver assistance apparatus 50 is a single apparatus has been described; however, the technology of the disclosure is not limited to such an example. Some or all of the functionalities of the driver assistance apparatus 50 may be provided to an external server installed outside the vehicle.

Further, the technology of the disclosure may be implemented as a vehicle equipped with the driver assistance apparatus described in the foregoing embodiment, a driver assistance processing method by the driver assistance apparatus, a computer program that causes a computer to serve as the driver assistance apparatus, and a non-transitory tangible recording medium in which the computer program is recorded.

DESCRIPTION OF REFERENCE NUMERALS

1: Vehicle
50: Driver assistance apparatus
51: Processing unit
53: Storage
55: Learned data storage
61: Obtainer
63: Surrounding environment detector
65: Learning processor
67: Risk setter
69: Allowable risk setter
71: Driving condition setter
73: Notification processor
$R_{col}$: Collision risk
$R_{dev}$: Road deviation risk
$R_{rul}$: Rule deviation risk
$U_{col}$: Collision allowable risk
$U_{dev}$: Road deviation allowable risk
$U_{rul}$: Rule deviation allowable risk
The invention claimed is:

1. A driver assistance apparatus configured to assist driving of a vehicle, the driver assistance apparatus comprising:
one or more processors; and
one or more non-transitory memories communicably coupled to the one or more processors, wherein
the one or more processors are configured to execute
an acquisition process of acquiring information on a surrounding environment of the vehicle,
a risk setting process of setting a rule deviation risk indicating a risk of deviation from a traffic rule related to travel of the vehicle for an object of the traffic rule, in accordance with one or both of an intensity of the traffic rule and an application time zone of the traffic rule,
an allowable risk setting process of setting a rule deviation allowable risk indicating a travel allowable area of the vehicle against the rule deviation risk, the rule deviation allowable risk being set higher in proportion to a magnitude of a vehicle speed of the vehicle, and
a driving condition setting process of setting a target track and a target speed for automated driving of the vehicle, based on the rule deviation risk and the rule deviation allowable risk, to cause the vehicle to travel in a location where the rule deviation allowable risk is higher than the rule deviation risk.

2. The driver assistance apparatus according to claim 1, wherein
the one or more processors are configured to set the rule deviation risk, in accordance with the intensity of the traffic rule, the intensity of the traffic rule comprising one or both of a kind of a boundary line between a first traveling zone on which the vehicle travels and a second traveling zone adjacent to the first traveling zone and a kind of a travel restriction zone set on a road.

3. The driver assistance apparatus according to claim 2, wherein
the boundary line differs in the kind in accordance with a degree of allowance for the vehicle straddling the boundary line, and
the one or more processors are configured to set the rule deviation risk higher as the kind of the boundary line corresponds to a lower degree of allowance for the vehicle straddling the boundary line.

4. The driver assistance apparatus according to claim 2, wherein
the travel restriction zone differs in the kind in accordance with a degree of allowance for the vehicle entering the travel restriction zone, and
the one or more processors are configured to set the rule deviation risk higher as the kind of the travel restriction zone corresponds to a lower degree of allowance for the vehicle entering the travel restriction zone.

5. The driver assistance apparatus according to claim 1, wherein the one or more processors are configured to set the rule deviation risk, in accordance with the intensity of the traffic rule, the intensity of the traffic rule comprising a lighting color of a traffic light.

6. The driver assistance apparatus according to claim 5, wherein
the lighting color of the traffic light switches to change from a first color indicating permission for passage of the vehicle to a second color indicating prohibition against the passage of the vehicle in one or more steps, and
the one or more processors are configured to change the rule deviation risk to a higher risk each time the lighting color of the traffic light switches from the first color to the second color.

7. The driver assistance apparatus according to claim 1, wherein
the one or more processors are configured to set the rule deviation risk, in accordance with a current time and the application time zone of a specific vehicle priority traveling zone for which the application time zone of the traffic rule is set.

8. The driver assistance apparatus according to claim 7, wherein the one or more processors are configured to set the rule deviation risk higher as the current time approaches the application time zone.

9. The driver assistance apparatus according to claim 1, wherein the one or more processors are configured to further set, in the risk setting process, a collision risk indicating a risk of a collision with an obstacle, set, in the allowable risk setting process, a collision allowable risk indicating a travel allowable area of the vehicle against the collision risk, the collision allowable risk being set lower in proportion to the vehicle speed of the vehicle, and set, in the driving condition setting process, the target track and the target speed for the automated driving of the vehicle, based on the rule deviation risk, the collision risk, the rule deviation allowable risk, and the collision allowable risk, to cause the vehicle to travel in a location where the rule deviation allowable risk is higher than the rule deviation risk and the collision allowable risk is higher than the collision risk.

10. The driver assistance apparatus according to claim 1, wherein the one or more processors are configured to further set, in the risk setting process, a road deviation risk indicating a risk of deviation from a road, set, in the allowable risk setting process, a road deviation allowable risk indicating a travel allowable area of the vehicle against the road deviation risk, the road deviation allowable risk being set lower in proportion to the vehicle speed of the vehicle, and set, in the driving condition setting process, the target track and the target speed for the automated driving of the vehicle, based on the rule deviation risk, the road deviation risk, the rule deviation allowable risk, and the road deviation allowable risk, to cause the vehicle to travel in a location where the rule deviation allowable risk is higher than the rule deviation risk and the road deviation allowable risk is higher than the road deviation risk.

11. A driver assistance processing method causing a computer to execute:

acquiring information on a surrounding environment of a vehicle;

setting a rule deviation risk indicating a risk of deviation from a traffic rule related to travel of the vehicle for an object of the traffic rule, in accordance with one or both of an intensity of the traffic rule and an application time zone of the traffic rule;

setting a rule deviation allowable risk indicating a travel allowable area of the vehicle against the rule deviation risk, the rule deviation allowable risk being set higher in proportion to a magnitude of a vehicle speed of the vehicle; and setting a target track and a target speed for automated driving of the vehicle, based on the rule deviation risk and the rule deviation allowable risk, to cause the vehicle to travel in a location where the rule deviation allowable risk is higher than the rule deviation risk.

12. A non-transitory tangible recording medium containing a computer program, the computer program causing a computer to execute:

acquiring information on a surrounding environment of a vehicle;

setting a rule deviation risk indicating a risk of deviation from a traffic rule related to travel of the vehicle for an object of the traffic rule, in accordance with one or both of an intensity of the traffic rule and an application time zone of the traffic rule;

setting a rule deviation allowable risk indicating a travel allowable area of the vehicle against the rule deviation risk, the rule deviation allowable risk being set higher in proportion to a magnitude of a vehicle speed of the vehicle; and setting a target track and a target speed for automated driving of the vehicle, based on the rule deviation risk and the rule deviation allowable risk, to cause the vehicle to travel in a location where the rule deviation allowable risk is higher than the rule deviation risk.

* * * * *